(12) United States Patent
Pharr

(10) Patent No.: US 7,030,879 B1
(45) Date of Patent: Apr. 18, 2006

(54) SYSTEM AND METHOD OF IMPROVED CALCULATION OF DIFFUSELY REFLECTED LIGHT

(75) Inventor: Matthew Milton Pharr, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 11/007,014

(22) Filed: Dec. 7, 2004

Related U.S. Application Data

(63) Continuation of application No. 10/186,093, filed on Jun. 26, 2002, now Pat. No. 6,853,377.

(51) Int. Cl.
 G06T 15/50 (2006.01)

(52) U.S. Cl. .................................................... 345/426
(58) Field of Classification Search ................ 345/420, 345/421, 426, 427
 See application file for complete search history.

(56) References Cited

U.S. PATENT DOCUMENTS 6,429,867 B1 8/2002 Deering (Continued)

OTHER PUBLICATIONS

Cook et al., The Reyes Image Rendering Architecture, ACM, 1987, pp. 95-102.

(Continued)

*Primary Examiner*—Almis Jankus
(74) *Attorney, Agent, or Firm*—Townsend and Townsend and Crew LLP

(57) ABSTRACT

The present invention is related to rendering computer animated video and/or images generally, and to improving the calculation of diffusely reflected light. The present invention includes a system and method of computing diffusely reflected light at one or more positions on surfaces in an object scene from object scene data. The present invention typically includes the step of and/or instructions for selecting a non-regular order for processing a plurality of positions on a surface—the plurality of positions having been predetermined. The present invention also includes the step of and/or instruction for processing the plurality of positions in the non-regular order. This processing typically includes computing diffusely reflected light at a position in the plurality of positions by reference to diffusely reflected light incident on the position when deriving the diffusely reflected light at the position by reference to diffusely reflected light at other positions computed by reference to diffusely reflected light incident on the other positions is inaccurate. Alternatively, deriving the diffusely reflected light at the position by reference to the diffusely reflected light at the other positions computed by reference to diffusely reflected light incident on the other positions when deriving the diffusely reflected light at the position by reference to the diffusely reflected light at the other positions is accurate.

22 Claims, 11 Drawing Sheets

U.S. PATENT DOCUMENTS 6,476,805 B1 * 11/2002 Shum et al. ................. 345/420
6,567,083 B1    5/2003 Baum et al.
6,618,047 B1 *  9/2003 Lim ........................... 345/421
6,639,597 B1 * 10/2003 Zwicker et al. ............. 345/427

OTHER PUBLICATIONS

Cook, Stochastic Sampling in Computer Graphics, ACM Transactions on Graphics, vol. 5, No. 1, Jan. 1986, pp. 51-72.

Pharr et al., Monte Carlo Evaluation of Non-Linear Scattering Equations for Subsurface Reflection, ACM, Jul. 2000.

Ward, Gregory et al. Irradiance Gradients Third Annual Eurographics Workshop on Rendering, Springer-Verlag, May 1992.

Ward, Gregory et al. A Ray Tracing Solution for Diffuse Interreflection; Computer Graphics, vol. 22, No. 4, Aug. 1998.

* cited by examiner

Vertices array 150

| Spatial location 152-1 | ••• | Spatial location 152-25 |
|---|---|---|
| Texture coordinates 154-1 | ••• | Texture coordinates 154-25 |
| Surface normal 156-1 | ••• | Surface normal 156-25 |
| Direction vector 158-1 | ••• | Direction vector 158-25 |

SYSTEM AND METHOD OF IMPROVED CALCULATION OF DIFFUSELY REFLECTED LIGHT

CROSS-REFERENCES TO RELATED APPLICATIONS

This application is a continuation of U.S. patent application Ser. No. 10/186,093, entitled "SYSTEM AND METHOD OF IMPROVED CALCULATION OF DIFFUSELY REFLECTED LIGHT," filed Jun. 26, 2002, now U.S. Pat. No. 6,853,377. The Ser. No. 10/186,093 application listed above is assigned to NVIDIA Corporation, the assignee of the present invention and is hereby incorporated by reference for all purposes.

This application is related to, and incorporates herein by reference, a U.S. patent application bearing Ser. No. 09/865,990, entitled "SYSTEM AND METHOD OF LINE SAMPLING OBJECT SCENE INFORMATION," and commonly assigned with the present invention. This application is also related to, and incorporates herein by reference, a U.S. patent application Ser. No. 10/157,579, filed on May 28, 2002, entitled "SYSTEM AND METHOD RELATED TO DATA STRUCTURES IN THE CONTEXT OF A COMPUTER GRAPHICS SYSTEM," and commonly assigned with the present invention. This application is also related to, and incorporates herein by reference, a U.S. patent application Ser. No. 10/177,678, filed on Jun. 20, 2002, entitled "SYSTEM AND METHOD OF SIMULATING MOTION BLUR EFFICIENTLY," and commonly assigned with the present invention.

The present invention is related to rendering computer animated video and/or images generally, and to improving the calculation of diffusely reflected light.

BACKGROUND OF THE INVENTION

A REYES image rendering architecture is a system for computing computer animated video or images. The details of an exemplary REYES image rendering architecture are described in detail by Robert L. Cook, et al. in "The Reyes Image Rendering Architecture," Computer Graphics, vol. 21, no. 4, July 1987, which is incorporated herein by reference. When processed in conjunction with a REYES image rendering architecture compatible renderer (a "REYES renderer"), primitives represent objects that may be included in the computer animated video or images. These primitives are typically diced into polygonal meshes prior to being shaded and projected onto an image plane. After projecting the polygonal meshes onto the image plane, visible polygons are identified. More specifically, the polygons closest to defined elements of the image plane are identified. These elements may comprise infinitesimal points, lines, or areas on the image plane. Color values computed for vertices of the visible polygons are then used to compute color values for the image plane.

To ensure that a sufficient amount of primitive detail is included in the computer animated video or images, each polygon in the polygonal meshes is approximately equal in size to a pixel (e.g., the smallest distinct area of the image plane). Computer animated video or images are represented by an array of numbers. In the case of a two-dimensional image, the array of numbers is a two-dimensional array and each number in the array corresponds to a tiny portion of the image. Each element in the array is referred to as a picture element (or pixel); and the pixel ordinarily has the same location in the array as the portion of the image it represents.

In the case of a gray scale image, the numerical value of each pixel represents the relative brightness (or intensity) of the portion of the image to which it corresponds. In the case of a color image, the numerical value of each pixel is a set of numbers (or a vector) representing the color of the portion of the image to which it corresponds. Several different systems are available for numerical representation of colors.

The amount of dicing applied to a primitive is, therefore, dependent upon the size of the primitive relative to a pixel. If the primitive is much larger, for example, a large amount of dicing may be required. Similarly, if the primitive is close in size to the pixel, a relatively small amount of dicing may be required.

Additionally, polygonal meshes produced by a REYES renderer are processed separately so that the REYES renderer need not maintain all of the polygonal meshes in memory or access more than just a subset of the polygonal meshes at any one time. Because of this aspect of a REYES renderer, color values computed for vertices do not typically incorporate global illumination. Persons skilled in the art recognize that global illumination includes accounting for the effects of other primitives in an object scene on a vertex being shaded (e.g., accounting for light reflected off of another primitive onto the vertex being shaded). Instead, a REYES renderer typically shades the vertices with texture maps and other non-global illumination techniques.

Prior art renderers that incorporate ray-tracing ("ray tracing renderers") trace a first set of rays (e.g., "visibility rays") from an imaginary camera or viewer's eye through a position (e.g., a pixel) on the image plane into an object scene. The positions at which the rays intersect the object scene are visible from the image plane. More specifically, a position intersected by a visibility ray is visible from the position on the image plane through which the ray is cast.

Shading the positions at which the rays intersect the object scene typically includes casting a set of rays (e.g., shading rays) from each of the intersection positions. Some or all of the shading rays may intersect other objects in the object scene. Color values computed at positions intersected by shading rays are then used to compute color values for the positions intersected by visibility rays. Ray tracing renderers, therefore, use global illumination to compute color values.

Ray tracing renderers may also dice primitives into polygonal meshes. But polygons included in such polygonal meshes may not include polygons approximately equal in size to a pixel. Instead, the size of the polygons is dependant upon, for example, the curvature of the object modeled by a corresponding primitive. Often times, therefore, polygonal meshes diced from a given primitive for a ray tracing renderer are much less complex than polygonal meshes diced from the same primitive by a REYES renderer. As the complexity of a polygonal mesh decreases, so does the amount of processing time required to determine whether a ray intersects the polygonal mesh.

In both REYES renderers and ray tracing renderers, the diffuse interreflection of light among objects in an object scene may be computed using techniques first described in detail by Gregory Ward et al. in "A Ray Tracing Solution for Diffuse Interreflection," Computer Graphics, Vol. 22, No. 4, August 1988, which is hereby incorporated by reference. This last technique is expanded upon by Gregory Ward and Paul Heckbert in "Irradiance Gradients," Eurographics Rendering Workshop, May, 1992, pp. 85–98, which is also hereby incorporated by reference. As described in more detail below, these techniques include either directly computing diffusely reflected light at a given position in an object scene or indirectly computing diffusely reflected light at a given position by reference to (e.g., averaging) diffusely reflected light directly computed at neighboring positions.

In the case of ray tracing renderers, the positions for which diffuse, indirect light is computed are typically selected by the visibility rays cast from the imaginary camera or viewer's eye through positions on the image plane. And in the case of REYES renderers, the positions for which diffuse, indirect light is computed are typically the vertices of the polygonal meshes created by the REYES renderers.

As described in more detail below, when applying techniques described in the two Gregory Ward publications listed above and other techniques for computing diffusely reflected light, these positions are simply processed by their order of selection (e.g., as visibility rays are cast into the object scene) or by their order of storage (e.g., a row by row in a polygonal mesh). So when indirectly computing diffusely reflected light at a given position, all of the other positions referenced during this computation typically precede the given position in terms of location. For example if this computation is executed for a vertex in a row of vertices on a grid of polygons, the other positions typically precede the vertex in the row.

As a result, when indirectly computing diffusely reflected light at a given position, a certain amount of extrapolation from one or more neighboring positions, which tend to be located in a common or similar direction from the given position, is required. In other words, these neighboring positions typically do not surround the given position. Because of this directional bias during the indirect computation of diffusely reflected light at the given position, increases or decreases in the rate of change of diffusely reflected light incident on a primitive may be missed. Similarly, diffusely reflected light at a given set of positions that is directly computed may be marked by relatively sharp and inaccurate variations from diffusely reflected light at neighboring positions that is indirectly computed before the diffusely reflected light at the given set of positions.

There is needed in the art, therefore, an improved technique for computing diffusely reflected light in an object scene. Specifically, a system and method for improved accounting of increases or decreases in the rate of change of diffusely reflected light.

BRIEF SUMMARY OF THE INVENTION

The present invention includes a system and method of computing diffusely reflected light at one or more positions on surfaces in an object scene from object scene data. The present invention typically includes the step of and/or instructions for selecting a non-regular order for processing a plurality of positions on a surface—the plurality of positions having been predetermined. The present invention also includes the step of and/or instruction for processing the plurality of positions in the non-regular order. This processing typically includes computing diffusely reflected light at a position in the plurality of positions by reference to diffusely reflected light incident on said position when deriving said diffusely reflected light at the position by reference to diffusely reflected light at other positions computed by reference to diffusely reflected light incident on said other positions is inaccurate. Alternatively, deriving the diffusely reflected light at the position by reference to the diffusely reflected light at the other positions computed by reference to diffusely reflected light incident on said other positions when said deriving the diffusely reflected light at the position by reference to the diffusely reflected light at the other positions is accurate.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE INVENTION

Figure 1A:
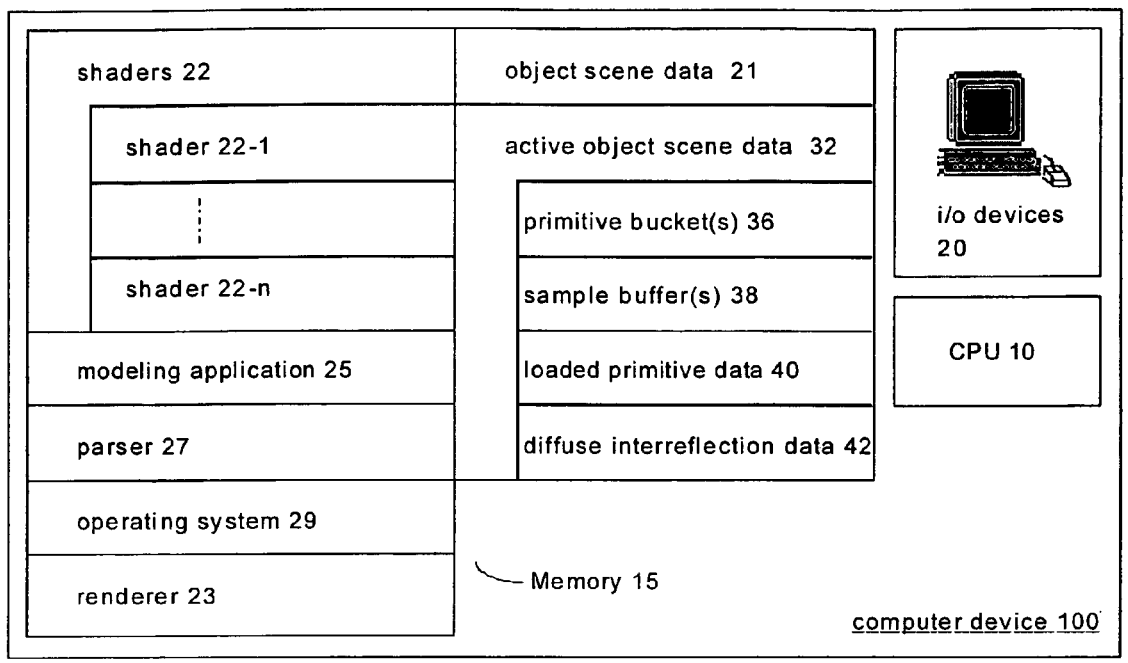
FIG. 1A illustrates a computer device consistent with an embodiment of the present invention.

FIG. 1A shows a computer device 100 configured to execute the various embodiments of the present invention described below. Included in the computer device 100 is a central processing unit (CPU) 10, a memory 15, and i/o devices 20. The CPU 10 executes instructions as directed by the operating system 29 and other programs maintained in the memory 15 and sends control signals to various hardware components included in the computer device 100. The memory 15 typically comprises high speed random access memory as well as non-volatile storage such as disk storage. In preferred embodiments of the present invention, the memory 15 typically includes object scene data 21, shaders 22, a renderer 23, a modeling application 25, a parser 27, an operating system 29, and active object scene data 32.

Object scene data 21 is typically static information maintained in the non-volatile section of the memory 15. The object scene data 21 may be maintained in any type of data structure (e.g., database, flat file system, etc.) without departing from the scope of the present invention. The object scene data 21 describes one or more object scenes. An object scene is one of many that, for example, comprise the scenes of computer animated video. For example, object scene data 21 may describe the movement and physical or visual attributes of characters, lights, and the environment of the object scene. In particular, and among other things, object scene data 21 specifies object locations and movement within the object scene through the use of one or more sets of coordinate systems. Exemplary coordinate systems are referred to as object space, shader space, work space, camera space, screen space, and raster space. Coordinates of one system may be transformed as needed to any other coordinate system to suit a given task.

Figure 1B:
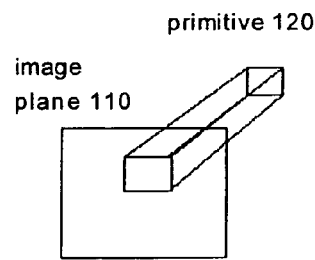
FIG. 1B illustrates the projection of an exemplary primitive on to an image plane in a manner consistent with an embodiment of the present invention.

Screen space typically includes x, y, and z coordinates. The x and y coordinates represent the horizontal and vertical positions with respect to the image plane 110 illustrated in FIG. 1B. The z coordinate represents a distance of, for example, an object from the image plane 110. As illustrated in FIG. 1B, the image plane 110 functions as a projection screen for primitives (e.g., models of objects) 120 included in the object scene. Thus, the image plane 110 facilitates a transformation of three-dimensional objects to a two-dimensional representation. The image plane 110 is analogous to a monitor or video display, and positions on the image plane 110 typically map to positions on a monitor or video display. Thus, references to areas of an image plane 110 are effectively references to pixels of a monitor or video display.

Object scene data 21 also includes, as noted above, information about the movement of the object during a period of time associated with an image frame. This period of time is analogous to the opening and closing of a camera shutter. This information is preferably used to simulate motion blur, which adds to the realism of computer animated video and images. To capture object movement, object scene data 21 provides the position of an object at the beginning of the period of time associated with the image frame and its trajectory and velocity during the image frame. This permits the calculation of a position of the object during the period of time associated with the image frame.

As indicated above, the objects are usually modeled with primitives. For example, a chair may be represented by a plurality of parametric patches or other primitives. Each of these primitives typically include physical properties of the objects they model. For example, a primitive that models a portion of a wooden chair may be configured to interact with light in a manner similar to that of wood.

Note that the term "primitive" used herein may refer to numerous types of geometric primitives such as parametric quadrics, polygons, polyhedra, parametric patches (e.g., NURBS), subdivision surfaces, analytic surfaces, implicit surfaces, constructive solid geometry objects, etc. However, certain steps described herein produce only certain types of primitives and certain steps described herein are trivial for certain types of primitives, but not for others.

Shaders 22 comprise one or more programs called shaders that also describe objects in the object scene. Shaders 22 are executable programs that provide, for example, information about objects in the object scene. Specific examples of shaders 22 include displacement shaders 22, surface shaders 22, light shaders 22, and atmosphere shaders 22. A displacement shader 22 typically offsets a primitive's vertices and surface normals, which are directions perpendicular to the primitive's surface, to adjust the primitive's interaction with light. A surface shader 22 algorithmically describes the appearance of a primitive. A light shader 22 algorithmically describes a light source. Atmosphere shaders 22 are typically used to simulate environmental conditions (e.g., fog, smoke, etc.). Other shaders 22 and shader functionality may also be used without departing from the scope of the present invention.

Also included in the memory 15 is the renderer 23. Renderer 23 is a program that processes object scene data 21, in conjunction with shaders 22, to render computer animated video or images as described in detail below.

A modeling application 25 may create some or all of the object scene data 21. And a parser 27 may be used by a modeling application 25 or other program to parse the object scene data 21.

The active object scene data 32 typically comprises one or more primitive buckets 36, one or more sample buffers 38, loaded primitive data 40, and diffuse interreflection data 42. Like the object scene data 21, the active object scene data 32 may be maintained in any type of data structure (e.g., database, flat file system, etc.) without departing from the scope of the present invention.

An area that corresponds to a primitive bucket 36 typically encompasses one or more pixels of a display. As described in more detail below, a renderer 23 typically processes primitives by reference to corresponding primitive buckets 36. The use of primitive buckets 36 permits the renderer 23 to control the number of primitives that are, for example, finely and coarsely diced into grids of polygons at any one time. A primitive may, however, be included in more than one primitive bucket 36 if it overlaps an area of the image plane 110 assigned to more than one primitive bucket 36. The primitive bucket 36 may take the form of an array or linked list. Information about primitives input from the object scene data 21 is, however, preferably maintained in the active object scene data 32. A primitive bucket 36, therefore, is preferably comprised of pointers to specific sections of the active object scene data 32. The renderer 23, furthermore, preferably orders the pointers by reference to the distance of primitives from the image plane 110. This ordering permits the renderer 23 to, for example, efficiently cull primitives that are occluded by one or more other primitives closer to the image plane 110. Despite their many advantages, primitive buckets 36 are not, however, a limitation of the present invention.

Sample buffers 38 typically include an entry for each unique spacial location of samples taken during the hide-visibility-grid step, which is described in detail below. A sample buffer 38 typically stores a spatial location, one or more colors, one or more transparency values, and one or more depth fields. This information represents a minimum amount of data storage for each unique spacial location (of samples) and are eventually used to compute one or more color values for each sample buffer entry. For example, separate color values, transparency values, and depth values are maintained for each visible primitive that overlaps or is overlapped by a given sample location. Additionally, separate color values, transparency values, and depth values are maintained for each instant during an object scene at which a given spatial location is sampled.

As noted above, this application is related to, and incorporates herein by reference, the U.S. patent application Ser. No. 10/157,579, filed on May 28, 2002, entitled "SYSTEM AND METHOD RELATED TO DATA STRUCTURES IN THE CONTEXT OF A COMPUTER GRAPHICS SYSTEM," and commonly assigned with the present invention. This U.S. patent application describes a data structure (e.g., a specialized sample buffer 38) optimized for storing, retrieving, and updating information in a line sampling embodiment of the present invention. This data structure is also within the scope of the present invention.

As note above, this application is related to, and incorporates herein by reference, the U.S. patent application bearing Ser. No. 09/865,990, entitled "SYSTEM AND METHOD OF LINE SAMPLING OBJECT SCENE INFORMATION," and commonly assigned with the present invention. This incorporated U.S. patent application describes in detail a system and method of distributing line samples spatially (i.e., defining spatial locations of samples) that is within the scope of the present invention. Other techniques may be used for distributing samples (line samples, point samples, area samples, etc.) spatially without departing from the scope of the present invention.

Figures 1C, 1D:
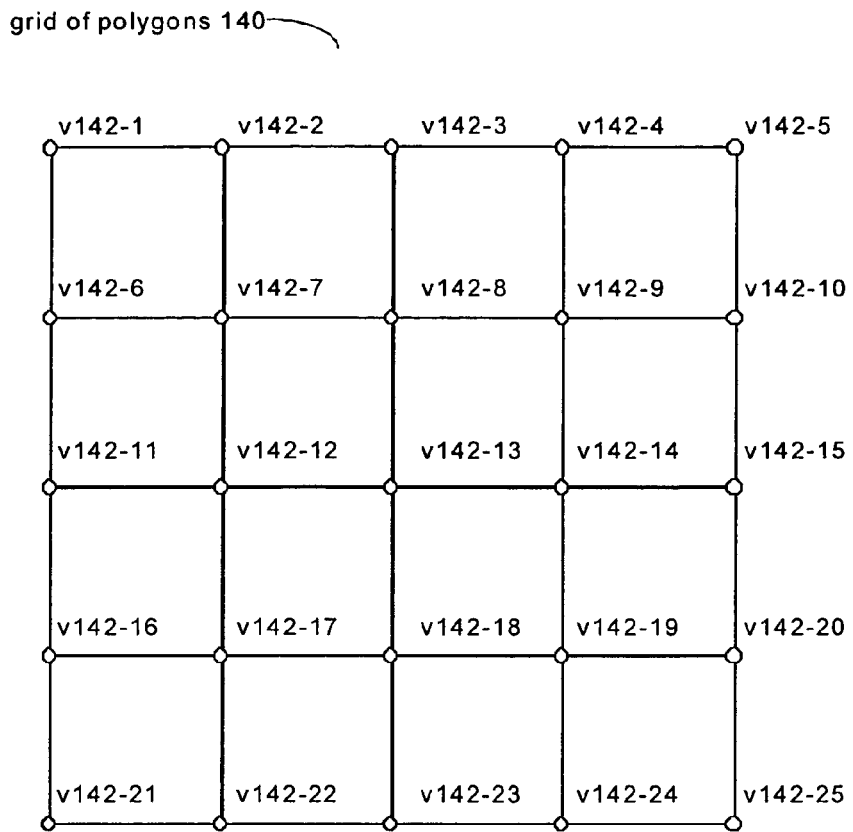
FIG. 1C illustrates a grid of polygons comprising a collection of vertices and edges.
FIG. 1D illustrates a two dimensional array for storing information about vertices included in a grid of polygons.

Loaded primitive data 40 typically includes information about primitives copied from the object scene data 21 and information generated by the renderer 23 while processing primitives. In particular, as described in more detail below, the present invention preferably includes the creation of a grid of polygons for a primitive or portion of a primitive described in the object scene data. A polygon typically comprises a collection of vertices connected by three or more edges. A grid of polygons is a collection of polygons with shared edges and vertices as illustrated in FIG. 1C. In this illustration, the grid of polygons 140 consists of a five-by-five set of vertices (v142-1–v142-25). Interior vertices are connected by four edges to four other vertices. Edge vertices are connected by two or three edges to two or three other vertices.

A grid of polygons is typically stored in, for example, a two dimensional vertices array 150 as illustrated in FIG. 1D. In this illustration, the vertices array 150 corresponds to the grid of polygons 140 illustrated in FIG. 1C, and includes an entry for each vertex included in the grid of polygons 140. Each entry in the vertices array 150 has a plurality of fields including, for example, a spatial location field 152, a texture coordinates field 154, a surface normal field 156, and a direction vector field 158. The spatial location field 152 typically includes the location of the corresponding vertex (typically given by x, y, and z coordinates, e.g., camera space coordinates). The texture coordinates field 154 typically includes coordinates that describe how a texture map maps onto an primitive. The surface normal field 156 typically includes a vector that is perpendicular to a primitive or object modeled by the primitive at the location of the corresponding vertex. Alternatively, the vector is an average of surface normals for polygons that share the corresponding vertex (e.g., polygons for which a set of defining vertices includes the corresponding vertex). The direction vector field 158 stores a vector that is a direction to an imaginary camera or viewer's eye.

Because a vertices array is stored in conjunction with a specific primitive or portion or a primitive, the vertices array 150 need not include an identifier of a corresponding primitive or portion of a primitive. Nevertheless, the vertices array 150 may include a greater or smaller number of fields, to store more or less information, than that which is illustrated in FIG. 1D without departing from the scope of the present invention.

The diffuse interreflection data 42 typically includes diffuse interreflection data directly computed (e.g., by reference to objects that diffusely reflect light that is incident on a given position) for vertices of, or other positions on, grids of polygons created for primitives in a given object scene. As described in more detail below, this information is generated while shading grids of polygons created for primitives in a given object scene in step 256 of FIG. 2A.

In some embodiments of the present invention, data included in the diffuse interreflection data 42 may be used for a plurality of object scenes. Typically, a directive to use the diffuse interreflection data 42 for a plurality of object scenes is incorporated into the object scene data 21. If the renderer 23 is not directed to use the diffuse interreflection data 42 for a plurality of object scenes, it is discarded after each object scene is rendered.

Storage of the diffuse interreflection data 42 may be accomplished with a plurality of data structures without departing from the scope of the present invention. However, in preferred embodiments of the present invention, the data structure used to store the diffuse interreflection data 42 is a K-D tree. A K-D tree is a data structure for multidimensional, sparse data. Vertices of, or other positions on, grids of polygons are typically defined by x, y, and z coordinates, and are thus ideally suited for storage in a K-D tree. The diffuse interreflection data 42 is typically sparse because diffusely reflected light is directly computed at only a subset of all of the vertices of, or other positions on, grids of polygons created for an object scene. Further, the vertices or other positions included in this subset are not known in advance. A K-D tree provides an ideal means for storage, update, and retrieval of the diffuse interreflection data 42. An exemplary technique for creating and using K-D trees is described in detail by M. de Berg, et al. in "Computational Geometry: Algorithms and Applications," Springer, Berlin, 2000, which is hereby incorporated by reference.

An entry for a position (e.g., a vertex in or other position on a grid of polygons) in a K-D tree (e.g., the diffuse interreflection data 42) typically includes a location, the surface normal of the position, and two gradient values, a harmonic mean distance, and a recursion level for each computation of diffusely reflected light at the position. The location typically comprises x, y, and z coordinates for camera space. These coordinates are typically extracted from the active object scene data 32 the first time diffusely reflected light at the position is computed. In the case of positions other than vertices, the coordinates are computed at an intersection of a ray with a given primitive. As noted above, a surface normal is typically a vector that is perpendicular to primitive or object modeled by the primitive at the position. Alternatively, the vector may be an average of surface normals for polygons that share the corresponding vertex or the surface normal of the polygon upon which a position is located.

And as described in more detail below, diffusely reflected light at a given position may be separately computed for a plurality of recursion levels. More specifically, when diffusely reflected light at a given position is directly computed, a plurality of rays are cast into the object scene from the position. If a ray intersects a primitive in the object scene (e.g., a grid of polygons created for the primitive) (excluding lights in the object scene), diffusely reflected light at this intersection may be computed by casting additional rays into the object scene from this intersection (e.g., a position on a grid of polygons). Because the computation of diffusely reflected light at this intersection is secondary (e.g., provides a component of diffusely reflected light incident on another position), a smaller number of rays may be cast from this intersection. As a result, the computation of diffusely reflected light at this intersection may not be very accurate. This does not typically affect the final result of the rendering process adversely because, as noted above, this value is secondary. It is possible, though unlikely, that a plurality of rays cast into the object may intersect a given position, which may or may not correspond to a vertex. If, for example, the renderer 23 determines that diffusely reflected light at the vertex must be directly computed and that diffusely reflected light at the vertex has already been computed for a higher recursion level (e.g., the existing value is secondary), the renderer will not use the existing computation of diffusely reflected light. But if diffusely reflected light at a position has already been computed for a recursion level lower than that associated with a secondary ray that intersects the position, the renderer 23 will use the existing computation of diffusely reflected light. Because the existing computation of diffusely reflected light is more accurate than required by a secondary ray, there is no harm is using this value.

Additionally, a harmonic mean distance and two gradient values are computed in conjunction with diffusely reflected light. The computation of the harmonic mean distance is described in detail below, but briefly these values are dependant upon the rays cast to compute corresponding diffusely reflected light and the contribution of each ray thereto. More specifically, the harmonic mean distance is the harmonic mean distance of all of the rays cast to compute corresponding diffusely reflected light.

The first of the two gradients is a rotational gradient and the second of the two gradients is a translational gradient. The rotational gradient accounts for how diffusely reflected light at a position changes as the position is rotated. The translational gradient accounts for how diffusely reflect light changes as a position is translated. The use of the two gradients improves the accuracy of diffusely reflected light indirectly computed at a given position.

Attention now turns to a detailed discussion of steps taken, in conjunction with the computer device 100, in preferred embodiments of the present invention to render computer animated video or images.

Figure 2A:
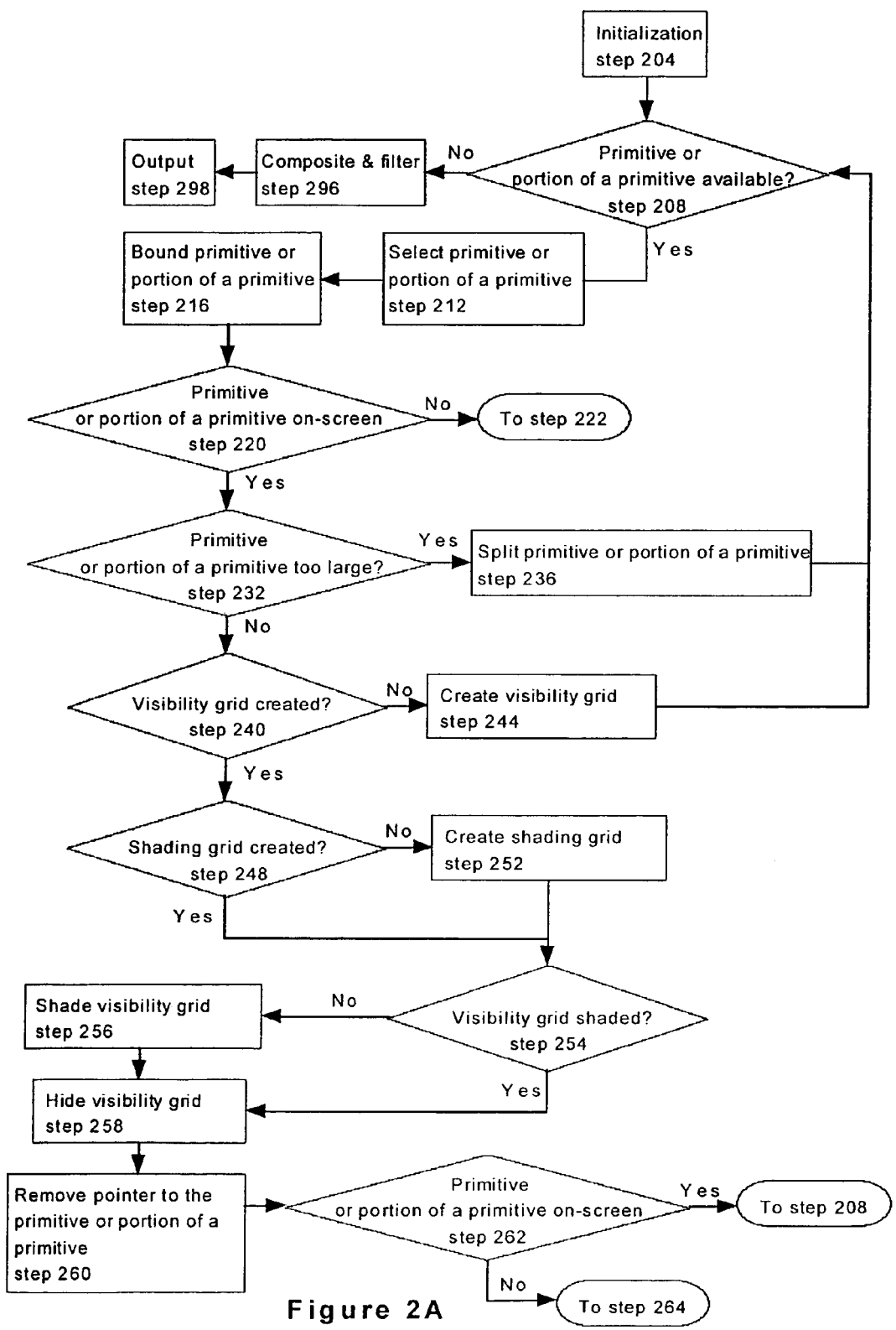
FIGS. 2A, 2B, 2C, and 2D illustrate processing steps for rendering computer animated video or images in a manner consistent with an embodiment of the present invention.

A first step of rendering an object scene is an initialization step (step 204, FIG. 2A). This step may include assigning areas of the image plane 110 to primitive buckets 36 and assigning sample locations to sample buffers 38. This step may also include the renderer 23 initializing the color values of sample buffers 38 to a default background color (e.g., the color black) and depths of sample buffers 38 to a maximum depth value (e.g., to infinity or the greatest distance that can be represented in the depth fields 134).

The renderer 23 then determines whether a primitive is available for processing (step 208). This step may include, for example, the renderer 23 checking for a command from a parser 27 or modeling application 25 to process a primitive from the object scene data 21. In some embodiments, the parser 27 parses sections of the object scene data 21, which may be, or include, a metafile. The parser 27 typically invokes a routine executable by the renderer 23 depending on the particular datum in the object scene data 21 parsed. In other embodiments, the modeling application 25 bypasses the parser 27, processes the object scene data 21, and invokes the appropriate routine executable by the renderer 23 (using, for example, an application program interface of the renderer 23). Essentially, the parser 27 or the modeling application 25 may invoke action by the renderer 23 for each primitive included in the object scene data 21. Additionally, the parser 27 or the modeling application 25 may set attributes and options applicable to a particular primitive. These attributes and options are then applied by the renderer 23 while processing the object scene data 21.

Step 208 may also included the renderer 23 scanning the object scene data 21 and one or more primitive buckets 36 for an available primitive. A primitive is not available from the object scene data 21 if, for example, each primitive defined by the object scene data 21 has been copied into the active object scene data 32. Similarly, a primitive is not available from a primitive bucket if, for example, each primitive assigned to the primitive bucket has been culled and/or subjected to the hide-visibility-grid step.

If a primitive is not available, the renderer 23 composites and filters data stored in the sample buffer 38 (step 296). This step includes combining color values stored in the sample buffer 38 to form a color value for each pixel that defines, for example, a display or image. As indicated above, a plurality of color values may be maintained for a sample location. Color values (in connection with transparency values and depth values) computed for a given sample location at different times during an object scene or image frame may be combined to form a single color value for the sample location. In preferred embodiments, color values computed at different times are weighted evenly and averaged. Many techniques for combining color values are known in the art, all are within the scope of the present invention. These color values are then output to a display or stored for subsequent use in memory 15 (step 298).

If a primitive is available, the renderer 23 preferably selects a primitive directly from the object scene data 21 or indirectly through a primitive bucket 36 (step 212). In preferred embodiments of the present invention, the renderer 23 selects all of the primitives defined in the object scene data 21 before selecting a primitive (indirectly) from a primitive bucket 36. And when a primitive is selected from the object scene data 21, the renderer 23 preferably adds some or all of the object scene data 21 pertaining to the primitive to the active object scene data 32. More specifically, the renderer 23 adds primitive data to the loaded primitive data 40 and assigns the primitive to one or more primitive buckets 36. Once assigned to a primitive bucket 36, the renderer inserts one or more pointers to the primitive data into the primitive bucket 36.

Additionally, in some embodiments of the present invention, the renderer 23 selects a current primitive bucket 36 and does not process other primitive buckets until no additional primitives are available from the current primitive bucket. Once the current primitive bucket is depleted, a new current primitive bucket is selected.

Another complexity in this process is the possible splitting of primitives. As described in more detail below, a primitive may be split such that a pointer included in a primitive bucket may point to only a portion of a primitive. So when an entry in a primitive bucket is selected by a renderer 23 (e.g., during step 212 described in the following paragraph), the renderer 23 may be selecting a portion of a primitive instead of an entire primitive.

After selecting a primitive or a portion of a primitive (step 212), the renderer 23 bounds the selected primitive or portion of a primitive in a bounding box (step 216). Persons skilled in the art recognize that a bounding box is an imaginary box (e.g., a volume) representing the maximum dimensions of a bound primitive or portion of a primitive. The bounding box permits the renderer 23 to quickly determine whether a primitive or portion of a primitive may occupy certain space in the object scene. It is possible that even if the bounding box does occupy the space, a primitive or portion of a primitive bound by the bounding box may not.

The renderer 23 may bound the selected primitive or portion of a primitive or a representation of the selected primitive or portion of a primitive. If, for example, the selected primitive or portion of a primitive comprises a parametric patch, the parametric patch may be bound. Because of the nature and complexity of such parametric patches, suitable bounding boxes may not tightly follow the contours of the selected primitive or portion of a primitive. How tightly the bounding box follows the contours of the selected primitive or portion of a primitive is a design choice. A bounding box that tightly follows the contours of the selected primitive or portion of a primitive typically requires more processing time for creation than a bounding box that does not tightly follow the contours of the selected primitive or portion of a primitive.

But as described in detail below, a primitive or portion of a primitive may be diced into a grid of polygons (e.g., a representation of a primitive or portion of a primitive). Because a grid of polygons is a relatively simplistic primitive, less processing time is typically required to create a bounding box for a grid of polygons than for primitives or portions of a primitive. As a result, the bounding box created in step 216 preferably bounds a grid of polygons created from the selected primitive or portion of a primitive when such a grid is available (e.g., step 244 has already been executed for the selected primitive or portion of a primitive).

The renderer 23 then determines whether the selected primitive or portion of a primitive is on-screen (step 220). The object scene data 21, and thus the active object scene data 32, typically includes a description of a viewing volume that contains everything that may be visible by an imaginary camera or viewer. If no portion of the bounding box is within this viewing volume, the selected primitive or portion of a primitive is not on-screen. The renderer 23 typically compares coordinates computed for the bounding box to a compatible set of coordinates for the viewing volume to make this determination. Additionally, when the selected primitive or portion of a primitive is within the viewing volume, as indicated by the bounding box, but faces away from the imaginary camera or viewer, the selected primitive or portion of a primitive is not on-screen. The renderer 23 may make this determination, for example, by computing a surface normal for the selected primitive or portion of a primitive. If the surface normal points away from the imaginary camera or viewer, the selected primitive or portion of a primitive faces away from the imaginary camera or viewer. Note that some primitives merely model a surface of an object, so there is no viewable "back side" of such primitives. Primitives that lack a viewable back-side and face away from the imaginary camera or view are not on-screen as well. Further, a primitive may not be on screen if, for example, each sample location overlapped by the bounding box of the primitive is overlapped by another primitive that is closer to the image plane 100 and each of these sample locations is in fact overlapped by another primitive.

In some embodiments, the renderer 23 bounds an entire primitive and determines whether the primitive is on-screen even when only a portion of a primitive is selected. More specifically, the renderer 23 bounds the primitive that includes the selected portion. Note that when subsequent portions of this primitive are selected, the renderer 23 preferably does not bound and retest the entire primitive.

Figure 3:
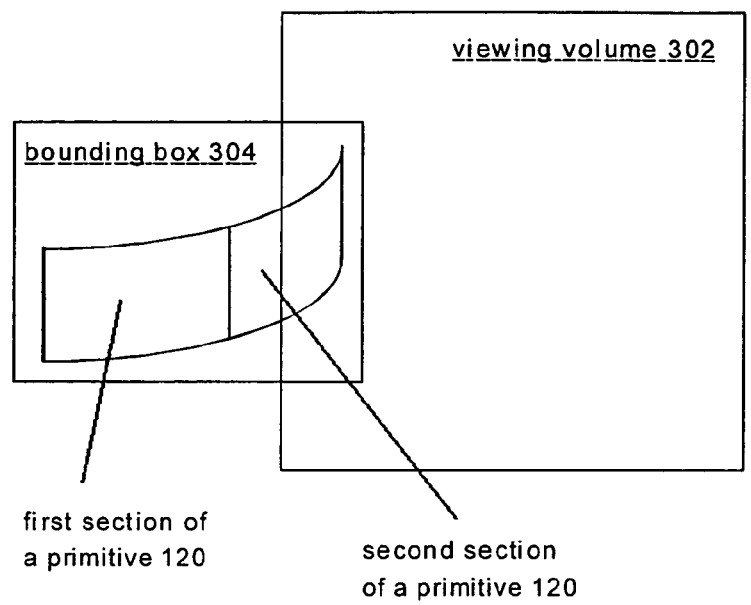
FIG. 3 illustrates a portion of a primitive bounding box overlapping an exemplary viewing volume.

When a portion of a primitive that is on-screen when considered as part of the primitive may not be on-screen when considered alone. As illustrated in FIG. 3, a portion of the bounding box 304 for a primitive overlaps an exemplary viewing volume 302. The primitive illustrated in FIG. 3 includes a line that marks where the primitive 120 may be split during the splitting step described below. The first portion of the primitive 120, as indicated by the line, falls entirely outside of the viewing volume 302. A bounding box for the first portion of the primitive 120 may not, therefore, overlap the viewing volume 302 after being subjected to the splitting step. But the second portion of the primitive, and any bounding box created therefore, will continue to overlap the viewing volume 302 after being subjected to the splitting step.

Figure 2B:
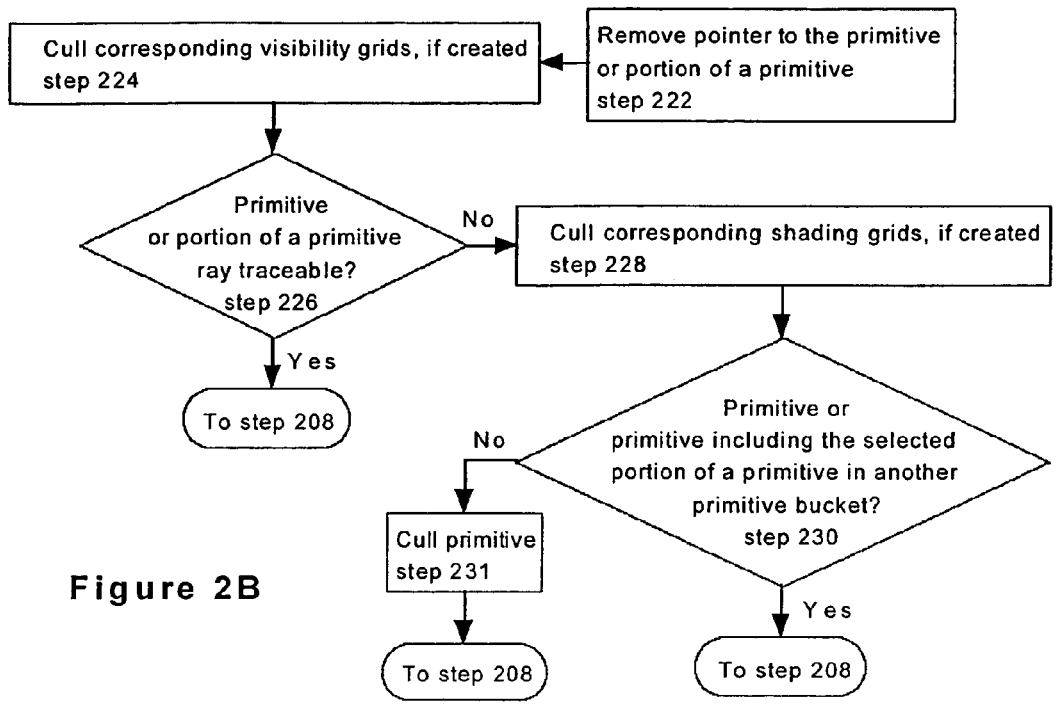

If the renderer 23 determines that the selected primitive or portion of a primitive is not on-screen (step 220-No), the renderer 23 preferably removes the pointer to the selected primitive or portion of a primitive from the primitive buckets 36 (step 222, FIG. 2B). But if the renderer 23 determines in step 220 that the primitive that includes the selected portion is not on-screen, the renderer 23 may remove all pointers to this primitive from the primitive buckets 36.

The renderer 23 then preferably culls corresponding visibility grids, which are described below, from the active object scene data 32 (step 224). At the very least, a visibility grid created for the selected primitive or the selected portion of a primitive is removed. But if the renderer 23 determines in step 220 that the primitive that includes the selected portion is not on-screen, the renderer 23 may remove all visibility grids created for this primitive.

The renderer 23 then determines whether the selected primitive or portion of a primitive is ray traceable (step 226). Note that if a primitive is ray traceable, all of its portions are typically ray traceable as well.

If the renderer 23 determines that the selected primitive or portion of a primitive is ray traceable (step 226-Yes), the renderer 23 returns to step 208 to select another primitive or portion of a primitive. Since the selected primitive or portion of a primitive may be intersected by a ray while the renderer 23 is shading another primitive, data about the selected primitive or portion of a primitive is preferably maintained.

If the renderer 23 determines that the selected primitive or portion of a primitive is not ray traceable (step 226-No), the renderer 23 culls the corresponding shading grid, which is described below, from the active object scene data 32 (step 228). This corresponding shading grid is not needed because there are no visibility grids corresponding to the selected primitive or portion of a primitive that may be shaded and this corresponding shading grid will not be intersected with rays to shade other primitives or portions of a primitive.

The renderer 23 then determines whether the selected primitive or the primitive that includes the selected portion is referenced in any primitive buckets 36 (step 230). If not (step 230-No), the renderer 23 culls data related to the selected primitive or the primitive that includes the selected portion from the active object scene data 32 (except, for example, an indication that the selected primitive or the primitive that includes the selected portion has already been processed) (step 231). This data is no longer needed because the primitive will not be referenced again while processing the active object scene data 32. But if the selected primitive or the primitive that includes the selected portion is referenced in any primitive buckets 36 (step 230-Yes) or after executing step 321, the renderer 23 returns to step 208 to select another primitive or portion of a primitive.

If the selected primitive or portion of a primitive is on-screen (step 220-Yes), the renderer 23 determines whether the selected primitive or portion of a primitive is too large (step 232). As described in more detail below, primitives or portions of a primitive may be subject to a process commonly referred to as dicing, which typically includes dividing a primitive or portion of a primitive, such as a bicubic patch, into a grid of polygons. Often times, a large number of polygons may result from the dicing process. But in preferred embodiments of the present invention, the renderer 23 avoids concurrently processing enough polygons to require excessive use of slower portions of the memory 15 (e.g., disk storage). Instead, the renderer 23 computes or estimates the number of polygons that may result from dicing the selected primitive or portion of a primitive to determine whether the selected primitive or portion of a primitive is too large.

If the selected primitive or portion of a primitive is too large (e.g., too many polygons may result from dicing the selected primitive or portion of a primitive) (step 232-Yes), the renderer 23 splits the selected primitive or portion of a primitive (step 236). For example, if the selected primitive or portion of a primitive is a parametric primitive, such as a NURBS, the renderer 23 identifies parametric lines that divide the selected primitive into two or more smaller NURBS. The renderer 23 then preferably deletes the entry included in the primitive buckets 36 for the selected primitive or portion of a primitive before the split. This entry is replaced with separate entries for each of the two or more smaller NURBS. Each of these entries points to data in the loaded primitive data 40 relating to the selected primitive or the primitive that includes the selected portion, but also identify specific portions of the selected primitive or the primitive including the selected portion. This way, any parameters, options, etc. applicable to the selected primitive or the primitive including the selected portion are, in effect, carried over to the new entries. New entries may then be separately processed by the renderer 23 in connection with steps 208–236 until each entry, and subsequent new entries, points to a portion of a primitive that is both on-screen and small enough for dicing.

If the selected primitive or portion of a primitive is not too large (step 232-No), the renderer 23 determines whether a finely diced or high resolution primitive ("visibility grid") corresponding to the selected primitive or portion of a primitive has been created (step 240).

As noted above, dicing a primitive or portion of a primitive typically produces a grid of polygons. Some grids of polygons that result from dicing are shaded and projected onto the image plane 110. To ensure that complex details of modeled objects are adequately rendered, each polygon shaded and projected onto the image plane 110 is preferably smaller than a pixel, which is the smallest indivisible unit of a monitor or display screen and is assigned only one color. Creating polygons of this size permits separate colors or color values to be computed for each pixel of a display. And in preferred embodiments, the renderer 23 (and shaders 22) computes colors or color values for each vertex that defines a polygon. So in these embodiments, four or more separate colors or color values are computed and combined for each pixel.

Part of the shading process (e.g., the process of computing color values) includes tracing rays for a position on a first primitive into an object scene defined by the object scene data 21. The renderer 23 then computes color values for positions on the same or other primitives intersected by these rays (which may include tracing rays from this position into the object scene in an iterative process). These color values are then used to compute a color value for the position on the first primitive.

Because the individual color values computed for primitives intersected by rays traced for the first primitive may not, individually, have a tremendous impact on the first primitive, the primitives intersected need not comprise a grid of polygons in which each polygon is approximately equal in size to a pixel of a display. Additionally, color values computed for primitives intersected by rays traced for the first primitive are computed at the position of the intersection, not surrounding vertices. In other words, the level of detail provided by very small polygons may not be necessary. Additionally, intersecting rays with very small polygons is a more time consuming process than intersecting rays with larger polygons.

Instead, primitives intersected by rays preferably comprise grids of polygons in which each polygon is sized by reference to, for example, the curvature of the object or object portion being modeled by the primitives. Thus, were the object is relatively flat, larger polygons (i.e., low resolution or coarsely diced grids of polygons) are sufficient. And where, the object has a high degree of curvature, smaller polygons (i.e., high resolution or finely diced grids of polygons) are often required to adequately represent the object. In other words, the resolution of a primitive (e.g., a grid of polygons) created for intersecting rays is independent of the primitive's size relative to a pixel. Generally, even objects or object portions with a high degree of curvature will not require polygons smaller than the size of a pixel.

But as indicated above, a primitive may be on-screen (and thus shaded and projected onto the image plane 110) and ray traceable (and thus possibly intersected with rays). As a result, some embodiments of the present invention include the steps of creating two primitives for objects or object portions. A first primitive, if created, may comprise a coarsely diced grid of polygons and be used by the renderer 23 for ray intersecting and shading visibility grids. A primitive for ray intersecting may not, however, be created when a corresponding object or object portion is defined by a relatively simple equation (e.g., a sphere). The renderer 23 is able to compute ray intersections more efficiently with such equations than with a coarsely diced grid of polygons. A second primitive typically comprises a finely diced grid of polygons and is used for shading and projection onto the image plane 110. Although separate primitives are created, the renderer 23 concurrently uses both primitives while rendering an object scene as described in more detail below.

If a visibility grid corresponding to the selected primitive or portion of a primitive has not been created (step 240-No), the renderer 23 finely dices the selected primitive or portion of a primitive to create the visibility grid (step 244). The renderer 23 then returns to step 208 to continue processing available primitives. In other words, an entry for the selected primitive or portion of a primitive is left in one or more primitive buckets 36 for subsequent selection by the renderer 23. In particular, the renderer 23 can create a tighter bounding box for a visibility grid than it can for a selected primitive or portion of a primitive, as described above. So the visibility grid may indicate that the selected primitive or portion of a primitive is not actually on-screen.

Numerous dicing techniques may be used without departing from the scope of the present invention. In one embodiment of the invention, primitives are subjected to a subdivision rule. The details of an exemplary subdivision rule are described in detail by E. Catmull and J. Clark in "Recursively generated B-spline surfaces on arbitrary topological surfaces," Computer-Aided Design 10(6):350–355, November 1978, incorporated herein by reference. In another embodiment, forward differencing is used to evaluate the selected primitive or portion of a primitive at a plurality of positions, which become vertices in the resulting primitive. The details of an exemplary forward differencing process are described in detail by Ari Rappoport in "Rendering Curves and Surfaces with Hybrid Subdivision and Forward Differencing," ACM Transactions on Graphics, 10(4):323–341, October 1991, incorporated herein by reference.

As described in the references incorporated in the preceding paragraph, the creation and/or identification of vertices is governed by coordinates and/or control points of a primitive from which a grid of polygons is being generated. In the case of subdivision, a simple example is piecewise linear subdivision wherein the x and y coordinates of a new vertex equal ½*($x_1$+$x_2$) and ½*($y_1$+$y_2$) respectively, where ($x_1$, $y_1$) and ($x_2$, $y_2$) are surrounding vertices used to derive the new vertex. More complex examples are possible and within the scope of the present invention. The point is that the generation of vertices is deterministic and governed by an explicit set of rules. The storage of vertices created in the subdivision process is similarly deterministic. For example, the vertices may be stored in order of creation. The vertices may also be stored in different orders without departing from the scope of the present invention.

Similarly, the generation of grids of micropolygons by forward differencing is deterministic and governed by an explicit set of rules. Persons skilled in the art recognize that forward differencing is the updating of discrete variable values by forming an expression that increments the discrete variable values from one value to the next (e.g., f(t+k)=f(t)+Df(t) or $f_{n+1}$=$f_n$+$Df_n$). The forward differencing process is typically executed in each parametric domain of a given primitive. For example, if a primitive is defined parametrically by u and v coordinates, an initial v coordinate is selected, the u coordinate is then evaluated at each of a defined step along the extent of the u domain. The v coordinate is then incremented, and the process of evaluating the u coordinate at each of a defined step along the extent of the u domain is repeated. The storage of vertices created with a forward differencing process is similarly deterministic. For example, the vertices are typically stored in order of creation.

If a visibility grid corresponding to the selected primitive or portion of a primitive has been created (step 240-Yes), the renderer 23 determines whether a coarsely diced or low resolution primitive ("shading grid") corresponding to the selected primitive or portion of a primitive has been created (step 248). If not (step 248-No), the renderer 23 coarsely dices the selected primitive or portion of a primitive to create the shading grid (step 252).

In some embodiments of the present invention, rays are cast from shading grids while shading a corresponding visibility grid. In these embodiments, therefore, a shading grid is always created for primitives or portions of a primitive on-screen. But in other embodiments of the present invention, a shading grid is created only if a corresponding primitive or portion of a primitive is ray traceable. In these embodiments, rays are cast directly from the visibility grid while shading the visibility grid. In either embodiment, however, rays cast are preferably intersected only with shading grids (note that a ray cast from a visibility grid may intersect itself), so a shading grid may be created for the selected primitive or portion of a primitive either way. But in the embodiments in which rays are cast directly from the visibility grid while shading the visibility grid, the creation of a corresponding shading grid is delayed at least until it is determined that a ray intersects a bounding box of the selected primitive or portion of a primitive.

The renderer 23 then determines whether the visibility grid corresponding to the selected primitive or portion of a primitive has been shaded (step 254). If the visibility grid corresponding to the selected primitive or portion of a primitive has not been shaded (step 254-No), the renderer 23 (and the shaders 22) shades the visibility grid (step 256). This step may include the renderer 23 evaluating displacement shaders 22, surface shaders 22, light shaders 22, and atmosphere shaders 22 for the vertices of the visibility grid and the shading grid. During these evaluations, the shaders 22 may compute color values, offset the positions of vertices, and/or modify the surface normals of primitives.

To facilitate the computation of color values, rays are cast for the visibility grid being shaded into the object scene. Rays may be cast from the visibility representation or a corresponding shading grid depending on the embodiment in use or instructions included in the object scene data 21. The object scene data 21 may specify, for example, that a displacement shader is attached to a primitive and thus always applied to a corresponding visibility grid during the shading step. The object scene data 21 may further specify, for example, that the effect of the displacement shader is significant such that rays must be cast directly from a visibility grid (even in embodiments that would otherwise cast rays from a corresponding shading grid).

Figure 4:
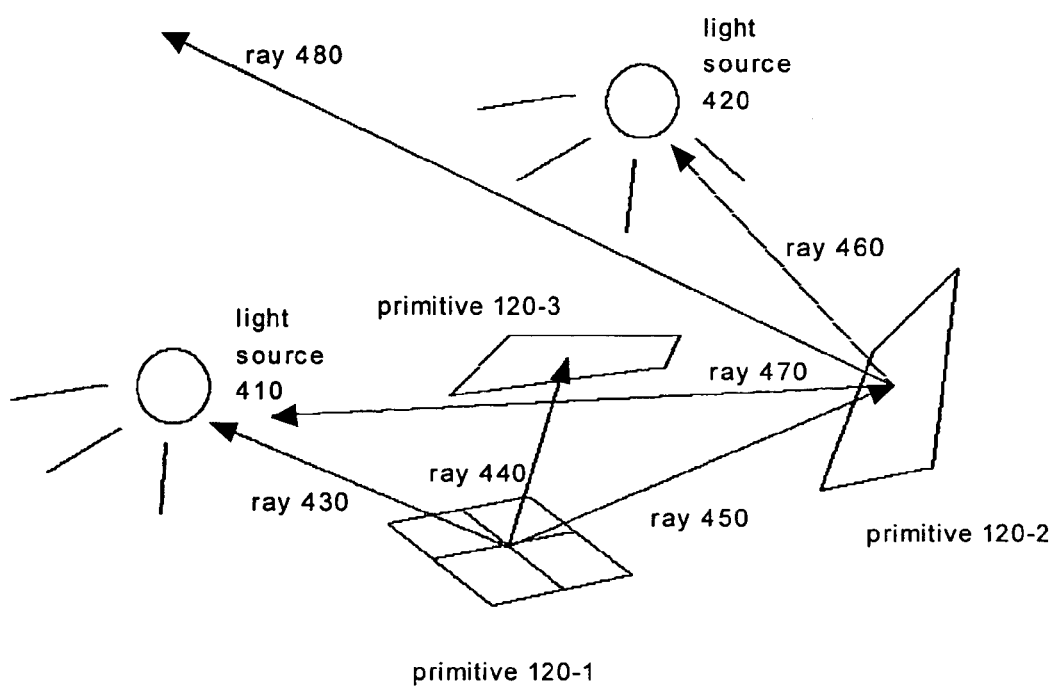
FIG. 4 illustrates ray tracing in a simplified object scene in a manner consistent with an embodiment of the present invention.

FIG. 4 illustrates ray tracing in a very simplistic object scene. Included in FIG. 4 are two light sources 410, 420, six exemplary rays 430, 440, 450, 460, 470, 480 a first primitive 120-1, a second primitive 120-2, and a third primitive 120-3. In this illustration, a vertex of the first primitive 120-1 is being shaded. To do so, separate rays 430, 440 are cast towards the first and second light sources 410, 420, respectively, and a ray 450 is cast (possibly randomly) into the object scene. The first light source 410 is intersected by a ray 430, so it shines light onto the vertex being shaded (e.g., provides a color value for the vertex). The second light source, however, is not intersected by a ray 440. Instead, the ray 440 cast towards the second light source is blocked by the third primitive 120-3. As a result, the vertex being shaded is in a shadow cast by the second light source 420 and the third primitive 120-3 (e.g., they too provide a color value for the vertex). The third ray cast, ray 450, intersects the second primitive 120-2. The renderer 23 (and shaders 22) responds to this intersection by casting additional rays 460, 470, 480 from this intersection. Two of these rays 460, 470 are cast towards, and intersect, the first and second light sources 410, 420 respectively. These intersections provide color values for the ray intersection on the second primitive 120-2 (e.g., the origin of the rays 460, 470). A third ray, ray 480, cast from the second primitive 120-2 does not intersect any of the primitives illustrated in FIG. 4. When this occurs, a background color value is typically assigned to the ray (e.g., to the origin of the ray). The color values computed for the rays 460, 470, 480 cast from the second primitive 120-2 are then used to compute a color value for the intersection of the ray 450 cast from the first primitive and intersected with the second primitive 120-2. This color value is then used along with the color values computed for the other two rays 430, 440 cast from the first primitive 120-1 to compute a color value for the vertex being shaded.

Note that the rays 460, 470, 480 cast from the second primitive 120-2 may be thought of as secondary rays since they are used to compute a color value for the intersection of another ray and a primitive. Each color value computed for these rays typically has less of an effect on the vertex being shaded than, for example, the rays cast directly from the vertex being shaded.

Figure 5A:
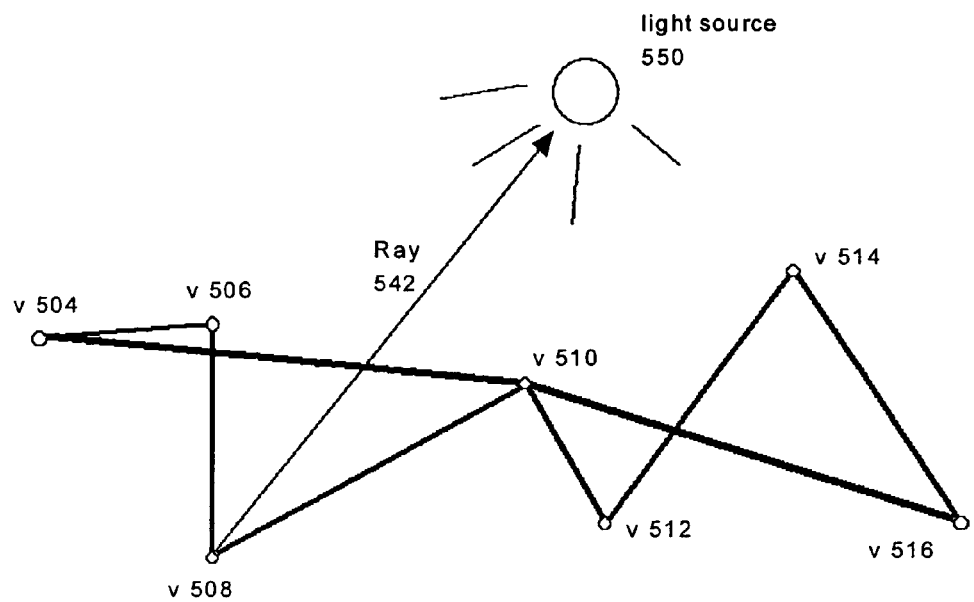
FIGS. 5A and 5B illustrate problems that may arise when tracing rays into an object scene for a finely diced grid of polygons.
Figure 5B:
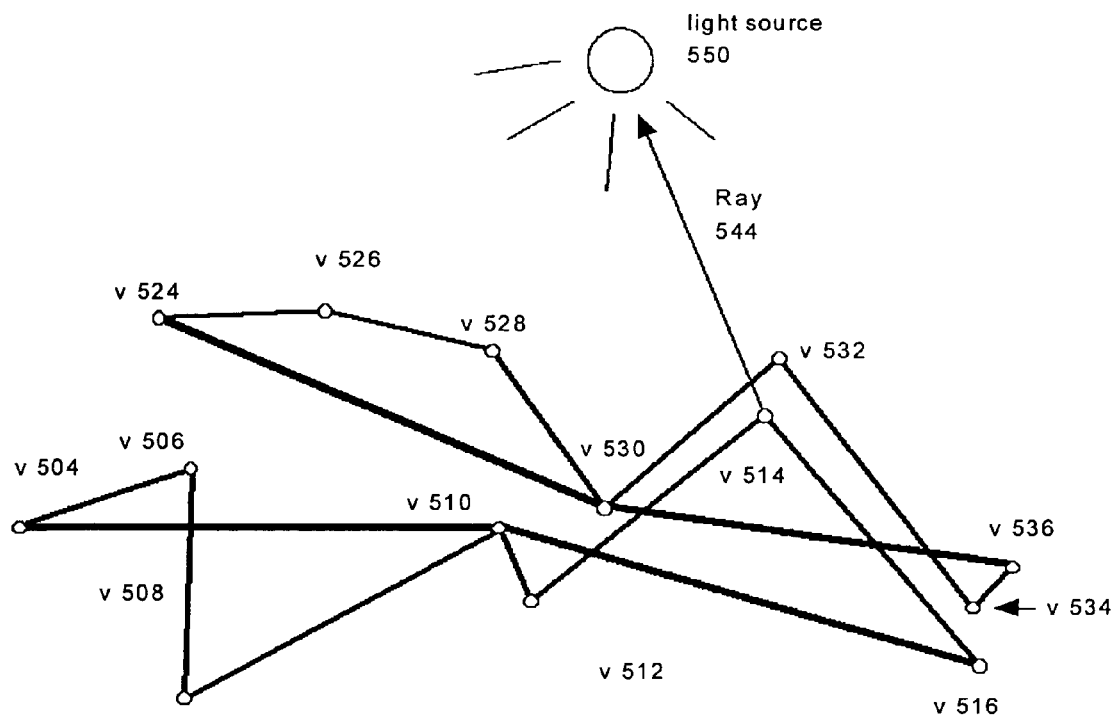

Without taking certain precautions described below, problems may result from tracing rays directly from a visibility representation for intersection with, for example, a shading representation (as noted above, rays may be intersected directly with objects or object portions defined by a relatively simple equation). FIGS. 5A and 5B illustrate typical problems. FIG. 5A includes a light source 550 and elements of a shading grid and a visibility grid. The elements of the visibility grid are defined by vertices v 504, v 506, v 508, v 510, v 512, v 514, and v 516. These vertices are connected by thin edges (e.g., edges of a polygon). A subset of these vertices, including vertices v 504, v 510, and v 516, define the elements of the shading grid and are connected by thick edges. Note that only some embodiments of the present invention use shading and visibility grids that share vertices.

Ray 542 is shown being projected from vertex v 508 of the visibility grid. The path of the ray 542 illustrated in FIG. 5A shows that the ray intersects with an edge of the shading grid. This sort of inter-object intersection is often invalid and capable of producing perceivable image artifacts. In this example, the ray 542 would otherwise intersect the light source 550, which would shine light on the vertex v 508. Instead, the vertex v 508 is invalidly in the shadow of the shading grid.

FIG. 5B includes the items illustrated in FIG. 5A and elements of a second shading grid and a second visibility grid. The elements of the second visibility grid are defined by vertices v 524, v 526, v 528, v 530, v 532, v 534, and v 536. These vertices are connected by thin edges (e.g., edges of a polygon). A subset of these vertices, including vertices v 524, v 530, and v 536, define the elements of the second shading grid and are connected by thick edges.

As illustrated in FIG. 5B, the (first) visibility grid overlaps the second shading grid. As a result, the exemplary ray 544 cast from the vertex v 514 does not intersect the second shading grid as it should. And again, in preferred embodiments of the present invention, rays are intersected only with coarse representations of objects so the ray 544 does not intersect the second visibility grid either. Because the ray 544 does not intersect the second shading or visibility grid, the ray 544 intersects the light source 550, which shines light on the vertex v 514.

But as indicated by the second visibility grid, which is typically more representative of that actual shape and position of a modeled object than a shading grid, the vertex v 514 should be in a shadow of the object modeled by the second shading and visibility grids. But the light source 550 invalidly shines on the vertex v 514.

Embodiments of the present invention include numerous techniques for addressing the problems illustrated in FIGS. 5A and 5B, two of which are described in detail below. In one embodiment of the present invention, origins of rays, such as ray 542 and ray 544, are moved from a visibility grid to a shading grid.

Figure 5C:
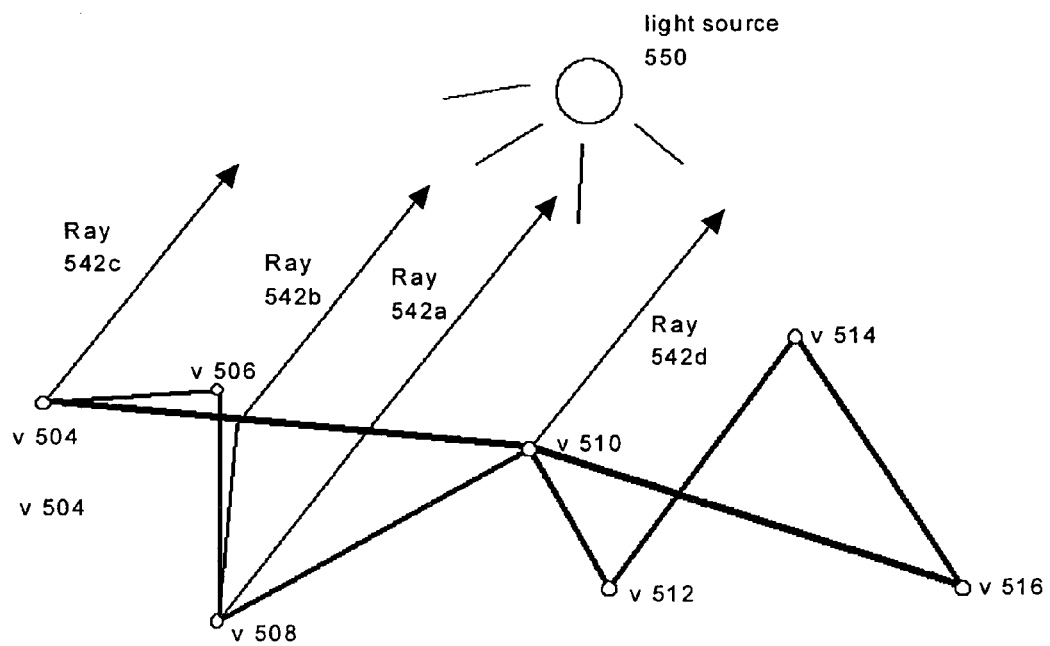
FIGS. 5C, 5D, 5E, and 5F illustrate solutions, which are consistent with embodiments of the present invention, for the problems illustrated in FIGS. 5A and 5B.

FIG. 5C illustrates ray 542 after its origin is moved to four exemplary positions on the shading grid. One position is illustrated by ray 542a. The origin of ray 542a, as indicated by the thin black line, is located at the intersection of the original ray, ray 542, and the shading grid. In some respects, this is the most accurate ray origin since ray 542a will intersect what ray 542 would have intersected. But this is not always possible since a shading grid and a visibility grid may not overlap in this fashion.

Another position is illustrated by ray 542b. The origin of ray 542b is located at a position on the second shading grid that is closest to the vertex v 508. A thin black line, which is perpendicular to the edge connecting vertices v 504 and v 510 and intersecting both the vertex v 508 and the origin of ray 542b, is included in FIG. 5C to illustrate that the origin of ray 542b is the position on the second primitive that is closest to the vertex v 508.

Also illustrated in FIG. 5C are rays 542c and 542d. These rays illustrate slight variations of the strategies discussed in the preceding two paragraphs. The origin of ray 542c is the vertex v 504, which is the vertex on the shading grid that is closest to the vertex v 508 and the origin of the ray 542b (the position on the shading grid closest to the vertex v 508). The origin of ray 542d is the vertex v 510, which is the vertex of the shading grid that is closest to the intersection of the shading grid and the path of the ray 542. In certain situations, however, mapping ray origins to vertices on a shading grid may be problematic. Consider a situation where a primitive models a large flat surface. A shading grid derived from such a primitive may comprise a very small number of vertices over a relatively large area. But a visibility grid derived from such a primitive may comprise a very large number of vertices because of the size of the surface in relation to a pixel area. This situation may, therefore, result in image artifacts due do a large number of ray origins being mapped to a small number of vertices and the offset of the ray origins from their original positions being great.

Figure 5D:
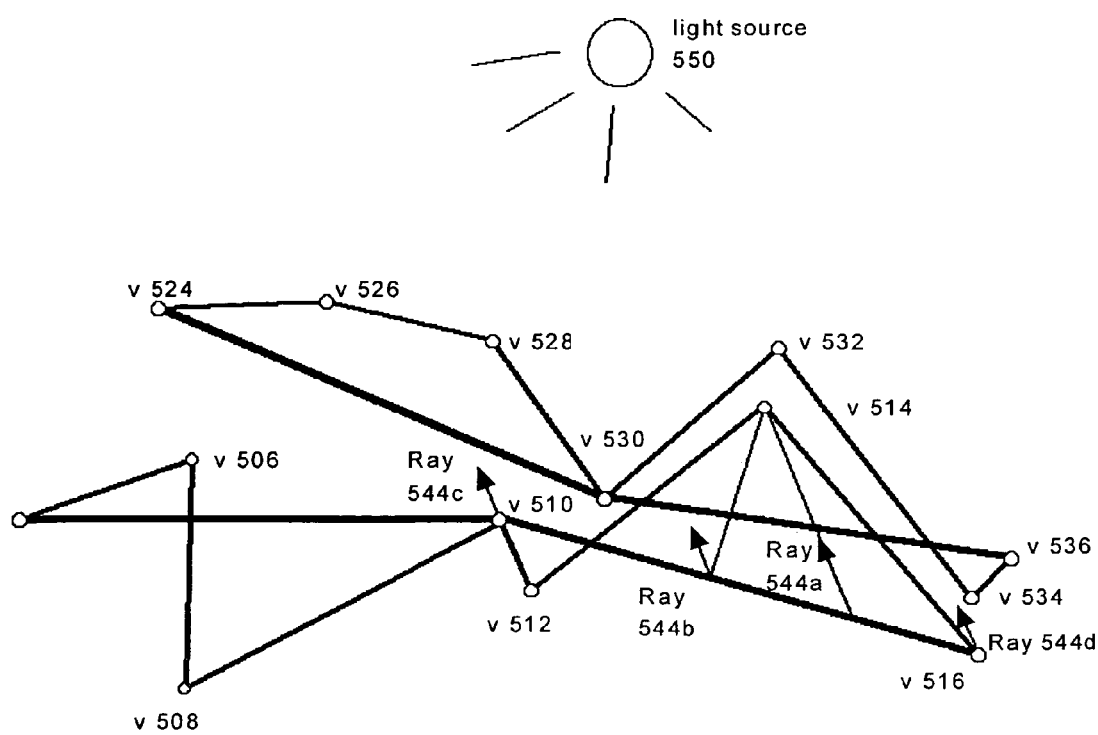

FIG. 5D illustrates ray 544 after its origin is moved to four exemplary positions on the (first) shading grid. One position is illustrated by ray 544a. The origin of ray 544a, as indicated by the thin black line, is located at the intersection of the ray 544 (if traced towards the first shading grid) and the first shading grid.

Another position is illustrated by ray 544b. The origin of ray 544b is located at a position on the first shading grid that is closest to the vertex v 514. A thin black line, which is perpendicular to the edge connecting vertices v 510 and v 516 and intersects both the vertex v 514 and the origin of ray 544b, is included in FIG. 5D to illustrate that the origin of ray 544b is the position on the first shading grid closest to the vertex v 514.

Also illustrated in FIG. 5D are rays 544c and 544d. These rays illustrate slight variations of the strategies discussed in the preceding two paragraphs. The origin of ray 544c is the vertex v 510, which is the vertex on the first shading grid that is closest to the vertex v 514 and the origin of the ray 544b (the position on the first shading grid closest to the vertex v 514). The origin of ray 544d is the vertex v 516, which is the vertex on the first shading grid that is closest to the intersection of the shading grid and the path of the ray 544 (if traced towards the first shading grid).

As a result of the ray origin shifting illustrated in FIGS. 5C and 5D, the ray 542 will not invalidly intersect the first shading grid and the ray 544 will not invalidly bypass the second shading grid. While these techniques may introduce a certain amount of inaccuracy into a resulting image, they provide an improvement over prior art since any such inaccuracy is less than that caused by invalid inter-object intersections.

Figure 5E:
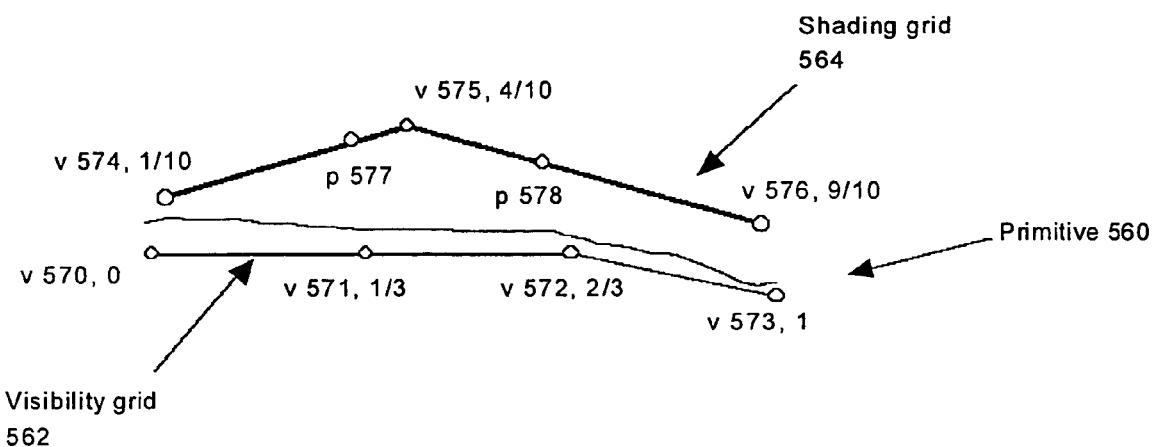

In preferred embodiments, parameters of parametrically defined primitives (e.g., NURBS) are used to compute positions on shading grids corresponding to vertices of visibility grids. When a primitive is defined parametrically, the vertices of a corresponding visibility grid and a corresponding shading grid include parameters associated with a specific position on the primitive. Consider the illustration of FIG. 5E, which includes the curved surface of primitive 560 (thinnest line), a visibility grid 562 corresponding to the primitive 560, a shading grid 564 (thickest lines) corresponding to the primitive 560, vertices v 570, v 571, v 572, v 573, v 574, v 575, v 576, position p 577, and position p 578. As indicated in FIG. 5E, vertices v 570, v 571, v 572, v 573, v 574, v 575, and v 576 have exemplary parametric values equal to 0, ⅓, ⅔, 1, ¹⁄₁₀, ⁴⁄₁₀, and ⁹⁄₁₀ respectively. Additionally, vertices v 570, v 571, v 572, and v 573 define the visibility grid 562 and vertices v 574, v 575, and v 576 define the shading grid 564. The parametric values are derived from a common source, the primitive 560, so these values are used to compute positions on the shading grid 564 that correspond to positions (e.g., vertices) on the visibility grid 562.

To compute, for example, a position on the shading grid 564 that corresponds to the vertex v 571, the renderer 23 first locates vertices on the shading grid 564 that encompass the parametric value of vertex v 571. As noted above, vertex v 571 has a parametric value of ⅓. Vertices v 574 and v 575, therefore, encompass vertex v 571. The equation for computing the corresponding position is as follows p=(t−t0)/(t1−t0), where t is the parametric value of the vertex (or other position) on the visibility grid, t0 is the parametric value of a first of two vertices on the shading grid that encompass parametrically the vertex on the visibility grid, t1 is the parametric value of a second of two vertices on the shading grid that encompass parametrically the vertex on the visibility grid, and p is the position on the edge or line connecting the two vertices on the shading grid that encompass parametrically the vertex on the visibility grid. In this example, p=(⅓−1/10/4/10−1/10=7/9. The position p 577 on the edge or line that connects vertices v 574 and v 575 illustrates the result of this calculation.

To compute, for example, a position on the shading grid 564 that corresponds to the vertex v 572, the renderer 23 first locates vertices on the shading grid 564 that encompass the parametric value of vertex v 572. As noted above, vertex v 572 has a parametric value of ⅔. Vertices v 575 and v 576, therefore, encompass vertex v 572. The equation for computing the corresponding position is again p=(t−t0)/(t1−t0). In this example, p=(⅔−4/10/9/10−4/10=8/15. The position p 578 on the edge or line that connects vertices v 575 and v 576 illustrates the result of this calculation.

Figure 5F:
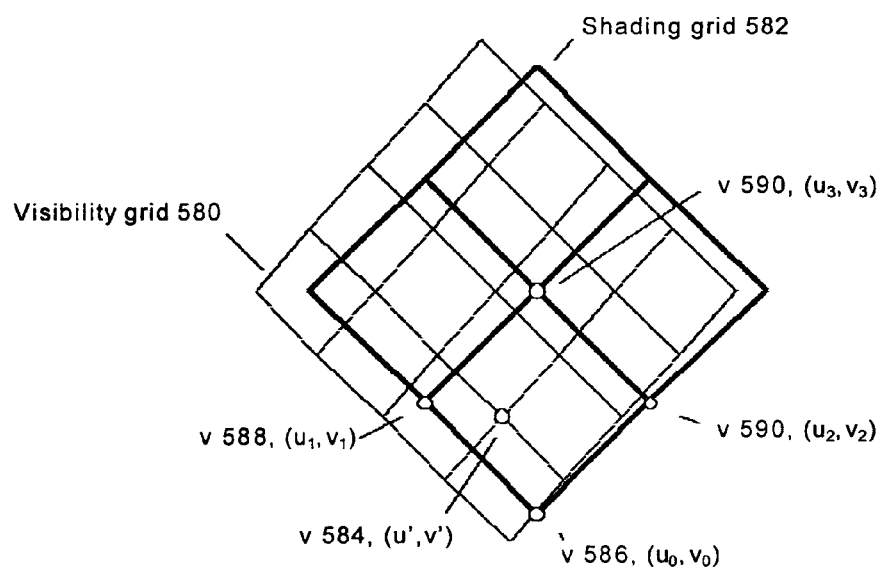

FIG. 5F illustrates an extension of the technique illustrated in FIG. 5E to two dimensions. FIG. 5F includes a visibility grid 580, a shading grid 582, vertex v 584, which is located on the visibility grid 580, and vertices v 586, v 588, v 590, and v 592, which are located on the shading grid 582. The visibility grid 580 and the shading grid 582 in this illustration were computed from a common primitive, but the visibility grid 580 includes more vertices, edges, polygons, etc. In other words, the shading grid 582 has a coarser resolution than the visibility grid 580.

In a preferred embodiment, reference is made to two parametric values (e.g., one value for each dimension) (arbitrarily named u and v) associated with the vertex v 584. The specific parametric values associated with the vertex v 584 are (u', v').

The renderer 23 preferably locates four vertices on the shading grid 582 that encompass the vertex v 584 parametrically. More specifically, the four vertices the form the smallest polygon that encompasses or overlaps the vertex v 584. In this illustration, these vertices are identified as v 586, v 588, v 590, and v 592. Parametric values $(u_0, v_0)$, $(u_0, v_1)$, $(u_1, v_0)$, and $(u_1, v_1)$ are associated with vertices v 586, v 588, v 590, and v 592, respectively. Each of these vertices also has an associated position within the object scene. Preferably, the position is given by x, y, and z coordinates (e.g., camera space coordinates).

The actual values of the parametric values (i.e., (u', v'), $(u_0, v_0)$, $(u_0, v_1)$, $(u_1, v_0)$, and $(u_1, v_1)$) are irrelevant for purposes of illustration. Suffice it to say that u' is greater than $u_0$, but less than $u_1$ and v' is greater than $v_0$, but less than $v_1$. Locating vertices on the shading grid 582 that meet this requirement, in connection with a vertex on the visibility grid 580, is a trivial operation and completed by analysis of active object scene data 32 corresponding to the primitive represented by the shading grid 582 and visibility grid 580.

After locating the four vertices (e.g., v 586, v 588, v 590, and v 592), weights for each coordinate that defines the position of the four vertices in the object scene are computed by reference to the parametric values of the vertex v 584 (e.g., (u', v')) and the four vertices (e.g., (u', v'), $(u_0, v_0)$, $(u_0, v_1)$, $(u_1, v_0)$) using the following equations:

$$pu = \frac{u' - u_0}{u_1 - u_0} \text{ and } pv = \frac{v' - v_0}{v_1 - v_0}$$

As noted above, each of the four vertices v 586, v 588, v 590, and v 592 preferably has an x, y, and z coordinate. Corresponding coordinates from each of these vertices are weighted by the pu and pv values, and then combined to form a coordinate for a position on the shading grid 582 that corresponds to the vertex v 584. The following equations are preferably used for this computation:

$$x = (1-pu)*(1-pv)*x_{v\ 586} + pu*(1-pv)*x_{v\ 590} + (1-pu)*pv*x_{v\ 588} + pu*pv*x_{v\ 590}$$

$$y = (1-pu)*(1-pv)*y_{v\ 586} + pu*(1-pv)*y_{v\ 590} + (1-pu)*pv*y_{v\ 588} + pu*pv*y_{v\ 590}$$

$$z = (1-pu)*(1-pv)*z_{v\ 586} + pu*(1-pv)*z_{v\ 590} + (1-pu)*pv*z_{v\ 588} + pu*pv*z_{v\ 590}$$

The above three equations use a particular bilinear interpolation, but other techniques are possible and within the scope of the present invention.

Another embodiment that addresses the problems illustrated in FIGS. 5A and 5B includes the use of bounding boxes to ensure that two objects do not overlap before using a shading grid to intersect rays. More specifically, after a ray is cast from a vertex of a visibility grid, the renderer 23 executes hit tests for each shading grid in the general area of the ray's path. As noted above, such rays preferably intersect only shading grids. But in this embodiment of the present invention, visibility grids are used to perform hit tests if a bounding box of the shading grid overlaps a bounding box of the visibility grid from which a ray is cast. With respect to FIG. 5A, the renderer 23 trivially rejects the shading grid and does not use it to perform a hit test. With respect to FIG. 5B, the second shading grid overlaps the visibility grid of the first object, so the bounding boxes of these primitives will also overlap and the renderer 23 will use the second visibility grid to perform a hit test in conjunction with the ray 544. As a result, the ray 544 does not invalidly bypass the object modeled by the second shading and visibility grids.

Figure 6A:
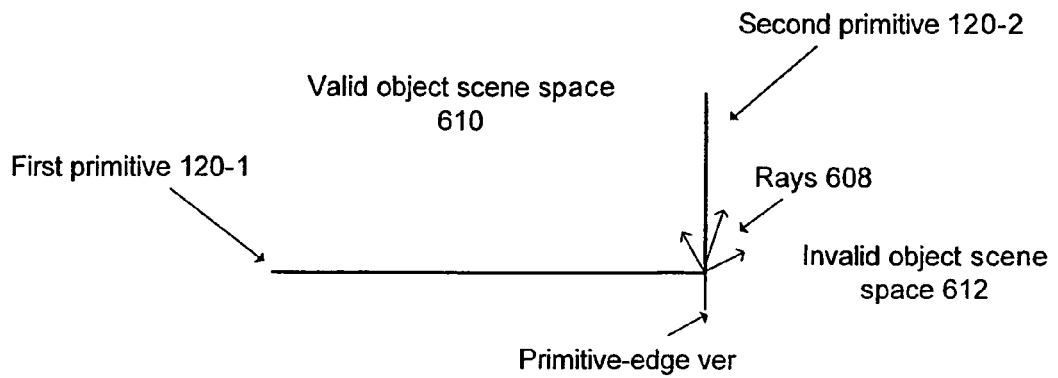
FIG. 6A illustrates a problem that may arise when tracing rays into an object scene from a primitive-edge vertex.

Embodiments of the present invention also address a problem that often occurs when casting rays from vertices of primitives (either visibility grids or shading grids). In prior art REYES architectures, and in some embodiments of the present invention, primitives are shaded without information about the locations of other primitives. As a result, rays cast from a primitive may enter invalid object scene space 612 (FIG. 6A). FIG. 6A is illustrative of this problem and includes a side-view of two flat, perpendicular primitives 120 (i.e., the first and second primitive) that abut each other along a common edge that includes the primitive-edge vertex designated 606, a set of rays 608 cast from the primitive-edge vertex 606, valid object scene space 610, and invalid object scene space 612. In this example, the two primitives 120 model the surface a common object. The space to the right of the two primitives 120 is an interior cavity of the common object and should not, therefore, be checked for possible sources of direct and indirect light for the primitive-edge vertex 606.

But since the renderer 23 does not typically have information about the location of the second primitive, the renderer 23 may cast rays directly into the invalid object scene space 612, as illustrated in FIG. 6A, while shading the primitive-edge vertex 606 for the first primitive. Such rays typically return color values that produce invalid shadows along edges of a primitive.

To avoid this problem, the renderer 23 preferably offsets the origin of the set of rays 608 so that the rays 608 can not be cast directly into the invalid object scene space 612. Any direction that will not result in a ray being invalidly cast through the surface of the first primitive will also not result in a ray being cast directly into the invalid object scene space 612.

Figure 6B:
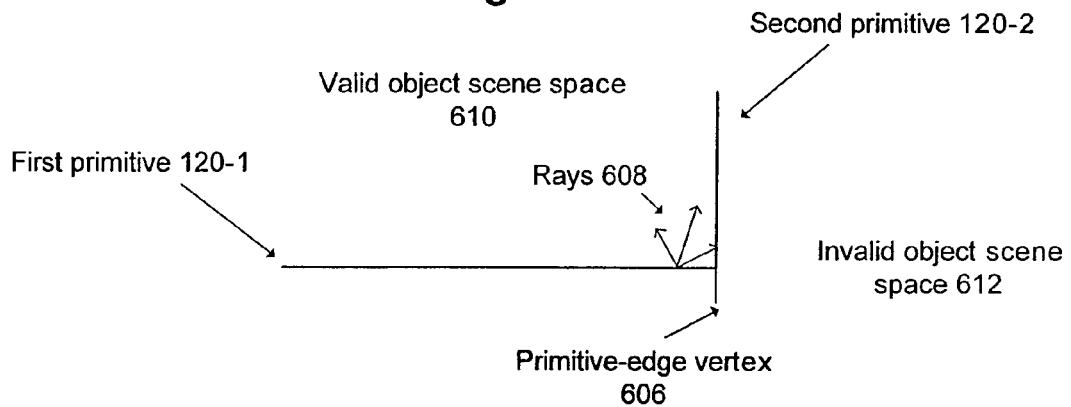
FIGS. 6B and 6C illustrate solutions, which are consistent with embodiments of the present invention, for the problem illustrated in FIG. 6A.
Figure 6C:
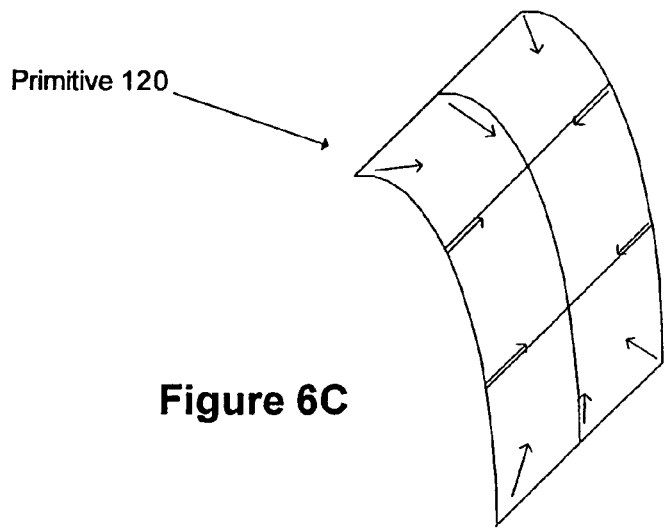

FIGS. 6B and 6C illustrate ray origin shifting. FIG. 6B illustrates a result of shifting the origin of the rays 608 illustrated in FIG. 6A away from the primitive-edge vertex 606. In this particular example, each ray origin is shifted to the same location. This is not, however, a limitation of the present invention. In some embodiments, one or more of the rays may be shifted to a unique location. FIG. 6C illustrate the general direction that ray origins are shifted for a primitive comprised of six polygons in an embodiment of the present invention.

The amount by which the rays are shifted can be determined in a number of ways without departing from the scope of the present invention. In some embodiments, for example, the amount may be fixed for all ray origins shifted (even though the direction of the shift may vary for each ray). In other embodiments, the amount of a shift is a function of a distance between the primitive-edge vertex and surrounding vertices.

As noted above, rays are used to determine light that shines on a primitive. Colors or color values computed for the vertices of a primitive are then combined to form a color value for the entire primitive.

In some embodiments, the color values computed for the vertices are bilinearly interpolated to form a color value for primitives. Persons skilled in the art recognize that interpolation is the process of determining plausible in-between values by reference to explicit values at particular points. Linear means that the values fall along a line from one known point to the next. This means the value changes a fixed amount for a fixed-sized step. Bi-linear means this process is carried out in two dimensions.

However, the light detected by the rays 608 in FIG. 6B does not correspond precisely to the light that actually falls on the primitive-edge vertex 606. So in some embodiments, the location of the new ray origin for the rays 608 is an input to the bi-linear interpolation process described above. In still other embodiments, other vertices of the primitive are used in conjunction with the location of a new ray origin for the rays 608 to extrapolate a color value for the primitive-edge vertex 606. In yet another embodiment, the light energy detected by the rays 608 is treated as if it were detected by rays with an origin at the primitive-edge vertex 606.

As noted above, surface shaders algorithmically describe the appearance of a primitive. This may include accounting for direct and indirect (i.e. reflected) light that shines on a primitive and how this light appears to an imaginary camera or viewer. Direct lighting is light produced by a light source that shines directly onto a primitive. Indirect lighting is light produced by a light source that is first reflected off of, or refracted through, another primitive before it shines on a primitive. And again, obtaining this information typically includes casting rays from given vertex into an object scene.

The surface of an object (and thus the primitive that models it) typically has both diffuse and specular components. As a result, both components should be accounted for when considering the interaction of light with a primitive. Persons skilled in the art recognize that light that strikes a primitive with a diffuse component is scattered equally in all directions by the diffuse component. The intensity of the reflected light is proportional to the cosine of the angle between the direction of the light that strikes the primitive and the primitive's surface normal. Specular components of a primitive, such as plastic, are responsible for shiny highlights. The intensity of light reflected by specular components of a surface is proportional to the cosine of the angle between the direction of the specular reflection and the direction of the light that strikes the primitive.

In some embodiments of the present invention, the intensity of direct light reflected by specular components of a primitive viewed from a specific direction is given by the following equation:

$$I_{ds}=(ks*lp/(d*d))*(L\cdot R)^n,$$

where $I_{ds}$ is the intensity of direct light specularly reflected by the primitive;

where ks is the primitive's diffuse coefficient of reflection;

where lp is the intensity of the light source shining on the primitive;

where d is a distance from the primitive to the light source;

where L is the direction to the light source;

where R is the direction of specular reflection; and where n an approximated factor that approaches one for dull surfaces and infinity for shiny surfaces.

In some embodiments of the present invention, the intensity of indirect light reflected by specular components of a primitive is given by the following equation:

$$I_{is}=Kr*R+Kt*T,$$

where $I_{is}$ is the intensity of indirect light specularly reflected by the primitive;

where Kr is the primitive's specular coefficient of reflection;

where R is the intensity of light computed for a (reflection) ray cast from the primitive;

where Kt is the primitive's specular coefficient of refraction; and where T is the intensity of light computed for a (refraction) ray cast from the primitive.

In some embodiments of the present invention, the intensity of direct light reflected by diffuse components of a primitive is given by the following equation:

$$I_{dd}=(kd*lp/(d*d))*N\cdot L,$$

where $I_{dd}$ is the intensity of direct light diffusely reflected by the primitive where kd is the primitive's diffuse coefficient of reflection;

where lp is the intensity of the light source shining on the primitive;

where d is a distance from the primitive to the light source;

where N is the primitive's surface normal; and where L is the direction to the light source shining on the primitive.

In some embodiments of the present invention, the intensity of indirect light reflected by diffuse components of a primitive is given by the following equation:

$$I_{id}=ka*la,$$

where $I_{dd}$ is the intensity of indirect light diffusely reflected by the primitive where ka is the primitive's diffuse coefficient of reflection; and where la is the intensity of ambient light.

As noted above, the present invention includes an improvement over prior art techniques for computing diffusely reflected light at a given position. As noted above, exemplary prior art techniques are described in detail by Gregory Ward et al. in "A Ray Tracing Solution for Diffuse Interreflection," Computer Graphics, Vol. 22, No. 4, August 1988, and by Gregory Ward and Paul Heckbert in "Irradiance Gradients," Eurographics Rendering Workshop, May, 1992, pp. 85–98, which are both hereby incorporated by reference.

Figure 7:
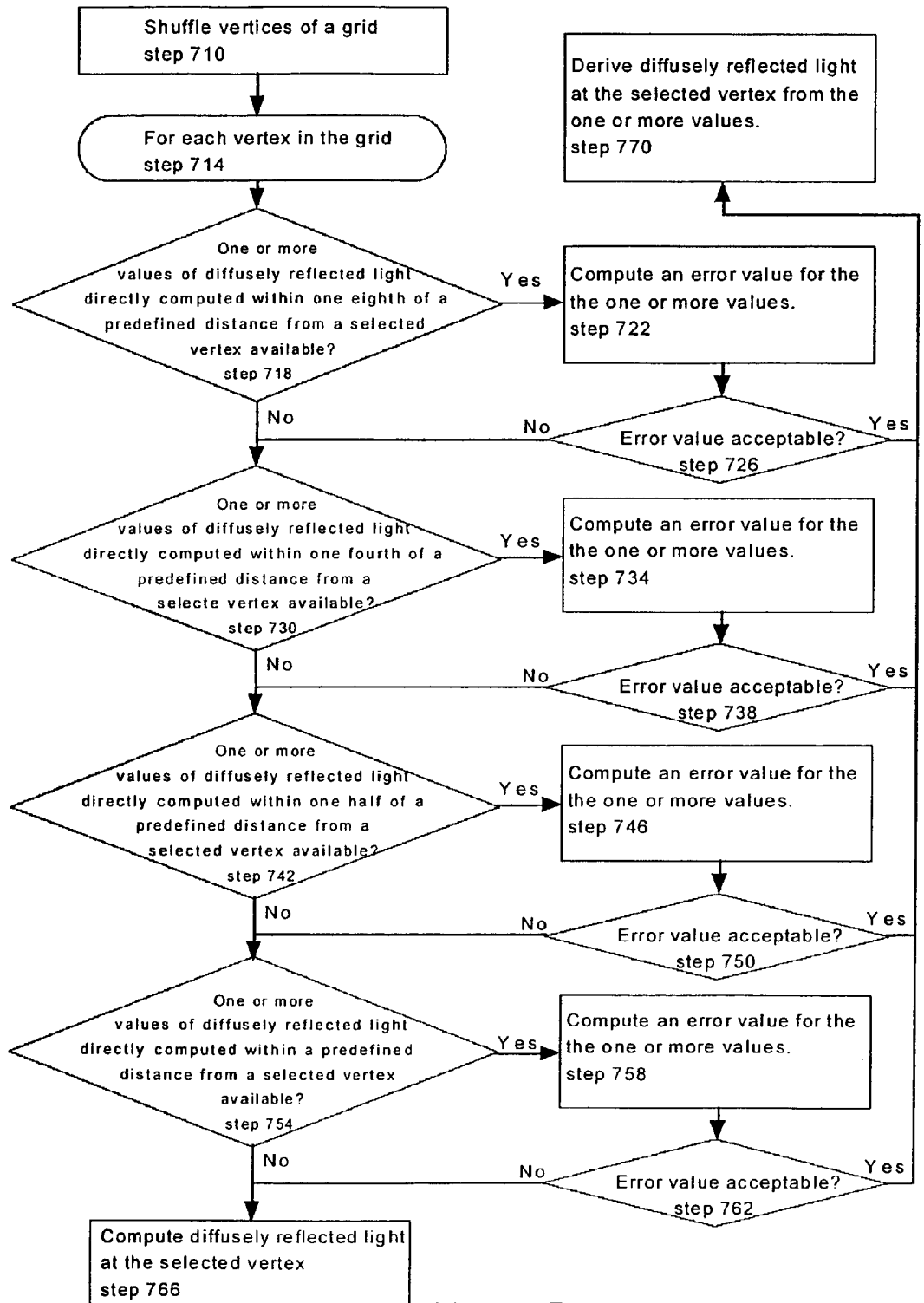
FIG. 7 illustrates processing steps for improved computation of diffusely reflected light in a manner consistent with an embodiment of the present invention.

Referring to FIG. 7, there are shown processing steps for an improved technique for computing diffusely reflected light (e.g., diffuse interreflection, color values, or ambient light) in a manner consistent with a preferred embodiment of the present invention. In a first processing step, the renderer 23 shuffles the vertices of a grid corresponding to the selected primitive or portion of a primitive (e.g., a shading grid or visibility grid depending on the particular embodiment used) (step 710). Typically, this includes initializing the entries of a "shuffle" array to the position of a given entry in the array (e.g., the fifth entry in the array is set to five, etc.). The shuffle array includes an entry for each of the vertices of the grid corresponding to the selected primitive or portion of a primitive. The renderer 23 then preferably executes a small for loop as follows:

```
FOR J = 1 TO N {
    OTHER = RANDOM WHOLE NUMBER BETWEEN 1 AND N;
    SWAP SHUFFLE[J] AND SHUFFLE[OTHER];
}
```

In this exemplary for loop, N is equal to the number of vertices included in the grid corresponding to the selected primitive or portion of a primitive. Finally, the swap statement exchanges the value of the j entry with the value of the other entry. The result of this for loop is a non-regular (e.g., a random, pseudo-random, or quasi-random) processing order. Subsequent use of the shuffle array is described below in connection with step 714. The for loop illustrated above is for illustration. A non-regular processing order may be generated in any number of ways without departing from the scope of the present invention.

Persons skilled in the art recognize that a random processing order is non-deterministic. A pseudo-random processing order is similar to a random processing order, but includes patterns that repeat. A quasi-random processing order is by definition not random. Instead, a quasi-random processing order is uniformly distributed but has certain qualities in common with a random and/or pseudo-random processing order.

Some embodiments of the present invention include pseudo-random and/or quasi-random sequences of numbers in memory 15 to facilitate the creation of a pseudo-random and/or quasi-random processing order, respectively. In these embodiments, renderer 23 steps through one of these sequences of numbers maintained in memory 15 when, for example, generating the other number as illustrated in the for loop above. In these embodiments, the other number may be generated, for example, by multiplying a number from one of these sequences by N. If the value of the other number has already been selected, it is discarded an another number is selected. This process in then continued until the numbers 1 through N are selected.

After shuffling the vertices of the grid, the renderer directly or indirectly computes diffusely reflected light at each vertex of the grid (step 714). Directly computing diffusely reflected light includes casting a plurality of rays into the object scene from a vertex or other position to determine diffusely reflected light incident on the vertex or other position (e.g., ambient light) (rays that intersect lights in the object scene are discarded or avoided). Indirectly computing diffusely reflected light typically includes averaging diffusely reflected light directly computed at one or more surrounding vertices or other positions.

As indicated above, the vertices of the grid are shuffled such that the vertices of the grid are processed in a non-regular order. In the for loop illustrated above, a shuffle array is created. This shuffle array is used in step 714 and subsequent steps to control the processing order of the vertices (e.g., to make sure that the vertices of the grid are processed in a non-regular order). For example, the renderer 23 may execute another for loop, with an iteration of the for loop for each of the vertices of the grid. The renderer 23 typically starts at the first entry of the shuffle array and processes the vertex identified by the contents of the first entry. For example, if the value of the first entry is five, the fifth entry in the vertices array 150 is selected for processing by the renderer 23. The renderer 23 then steps through the shuffle array, processing identified vertices along the way.

In a next step, the renderer 23 determines whether diffusely reflected light at one or more surrounding vertices or other positions within a distance that is, for example, one eighth of a predefined constant from a vertex selected in step 714 (i.e., the selected vertex) has been directly computed (step 718). As described above, diffuse interreflection data 42 is preferably stored in a K-D tree. The renderer 23 extracts the location of the selected vertex from the vertices array 150 and uses it to scan the K-D tree for entries (e.g., vertices or other positions at which diffusely reflected light has been directly computed) that are within a distance that is one eighth of the predefined constant from the selected vertex. The predefined constant is typically included in the object scene data 21, and represents a maximum distance the renderer 23 should scan. To avoid the identification of an unnecessarily large number of vertices or other positions, the renderer 23 preferably scans just a portion of this distance initially (e.g., one eighth of the distance), and increases this portion as needed until the full distance is scanned. In the embodiment illustrated in FIG. 7, this initial portion is one eighth, but other initial (and subsequent) portions may be used without departing from the scope of the present invention. Often times, a small number of vertices or other positions that are close to the selected vertex are sufficient for indirectly computing diffusely reflected light at the selected vertex. Using a smaller number of vertices or other positions for indirect computation of diffusely reflected light is faster. The use of an error value ensures that increased speed does not lead to unduly inaccurate computations.

Note that the diffuse interreflection data 42 includes diffusely reflected light directly computed for grids previously processed in conjunction with the selected or other primitive or portion of a primitive during the current or previous object scene. In other words, the vertices or other positions that may be within a distance that is one eighth (or other portion) of the predefined constant from the selected vertex may include vertices or other positions in addition to those included in the grid created for the selected primitive or portion of a primitive. Similarly, other grids may share one or more of the vertices or other positions located along the edges of the grid created for the selected primitive or portion of a primitive.

If the renderer 23 determines that diffusely reflected light at one or more surrounding vertices or other positions within a distance that is one eighth of the predefined constant from the selected vertex has been directly computed (step 718-Yes), the renderer 23 computes an error value for these vertices or other positions (step 722). Whether diffusely reflected light directly computed at a first vertex or other position may be used to suitably approximate the diffusely reflected light actually incident on a second vertex or other position depends upon the surface normals of the two vertices or other positions, the distance between the two vertices or other positions, and the length of the rays used to directly compute the diffusely reflected light at the first vertex or other position. If, for example, the two vertices or other positions face opposite directions, it is likely that diffusely reflected light directly computed at the first vertex or other position is less suitable for approximating the diffusely reflected light actually incident on the second vertex or other position. In this example, the diffusely reflected light incident on the two vertices or other positions may be very different. Additionally, as the distance between the two vertices or other positions increases, so does the likelihood that the diffusely reflected light incident on the two vertices or other positions may be very different such that diffusely reflected light directly computed at the first vertex or other position is less suitable for approximating the diffusely reflected light actually incident on the second vertex or other position. Finally, as the harmonic mean distance or other mean distance (e.g., arithmetic mean distance) of the rays used to directly compute diffusely reflected light at the first vertex or other position increases, so does the likelihood that diffusely reflected light directly computed at the first vertex or other position is less suitable for approximating the diffusely reflected light actually incident on the second vertex or other position. The computation of the harmonic mean distance is described below in connection with step 766.

To compute the error value of the diffusely reflected light computed at a given vertex or other position (i.e., the error value of the given vertex or other positions) with respect to the selected vertex, the following equation is preferably used:

$$\varepsilon_1 = \frac{\|\vec{P} - \vec{P}_1\|}{R_1} + \sqrt{1 - \hat{n} \cdot \hat{n}_1},$$

where $\varepsilon_1$ is the error value corresponding to the diffusely reflected light directly computed at the given vertex or other position, where $\vec{P}$ is a location of the selected vertex, where $\vec{P}_1$ is a location of the given vertex or other position, where $R_1$ is the harmonic mean distance of rays cast from the given vertex or other position, where $\hat{n}$ n is the surface normal of the selected vertex, and where $\hat{n}_1$ is the surface normal of the given vertex or other position.

If more than one vertex or other position is located in step 718, an error value is computed for the diffusely reflected light directly computed at each of these vertices or other positions as a group. Preferably, the following equation is used to accomplish this task:

$$\varepsilon = \frac{\sum_{i=1}^{n} \varepsilon_i}{n}$$

where $\varepsilon$ is the error value corresponding to the diffusely reflected light directly computed at each of these vertices or other positions as a group, where n is a count of the one or more vertices or other positions located in step 718, and where $\varepsilon_1$ is the error value computed for the diffusely reflected light directly computed at the $i^{th}$ vertex or other position in the one or more vertices or other positions located in step 718.

After computing the error value for the one or more vertices or other positions located in step 718, the renderer 23 determines whether the error value is acceptable (step 726). In preferred embodiments, this determination is made by reference to a predefined error tolerance included in the object scene data 21 and/or the active object scene data 32. If the error value computed in step 722 is less than this predefined error tolerance, the error value is acceptable.

In some embodiments of the present invention, the predefined error tolerance is adjusted by reference to the count of vertices or other positions located in step 718. More specifically, as the count of vertices or other positions increases, the predefined error tolerance is increased so that higher error values are acceptable. The principle at work in these embodiments is that higher error values computed for individual vertices or other positions become acceptable as the count of vertices or other positions increases.

If the error value computed for the one or more vertices or other positions located in step 718 is acceptable (step 726-Yes), the renderer 23 computes diffusely reflected light indirectly at the selected vertex (step 770). Typically, the result of this computation is a weighted average of the diffusely reflected light directly computed at the one or more vertices or other positions located in step 718. In preferred embodiments of the present invention, this computation is very similar to computing the error value. Again, reference is made to the surface normals of the two vertices or other positions, the distance between the two vertices or other positions, and the length of the rays used to directly compute the diffusely reflected light to weight the diffusely reflected light. But additionally, the renderer 23 references the two gradients stored in conjunction with the diffusely reflected light indirectly computed at the one or more vertices or other positions located in step 718 to perform this weighting. In particular, the following equation is preferably used:

$$E = \sum_{i=1}^{n} \varepsilon_i \sum_{i=1}^{n} \frac{E_i(\hat{n}_i \times \hat{n}) \cdot \vec{V}_r E_i + (\vec{P} - \vec{P}_i) \cdot \vec{V}_t E_i}{\varepsilon_i}$$

where E is the diffusely reflected light indirectly computed at the selected vertex, where $\varepsilon_i$ is the error value computed for the diffusely reflected light directly computed at the $i^{th}$ vertex or other position in the one or more vertices or other positions located in step 718, where n is a count of the one or more vertices or other positions located in step 718, where $E_1$ is the diffusely reflected light directly computed at the $i^{th}$ vertex or other position in the one or more vertices or other positions located in step 718, where $\vec{V}_r$ is the rotational gradient computed in conjunction with $E_1$, where $\vec{V}_t$ is the translation gradient computed in conjunction with $E_i$, where $\vec{P}$ is a location of the selected vertex, where $\vec{P}_1$ is a location of the $i^{th}$ vertex or other position in the one or more vertices or other positions located in step 718, where $\hat{n}$ is the surface normal of the selected vertex, and where $\hat{n}_1$ is the surface normal of the $i^{th}$ vertex or other position in the one or more vertices or other positions located in step 718.

If the error value computed for the one or more vertices or other positions located in step 718 is unacceptable (step 726-No) or if no vertices or other positions are located in step 718 (step 718-No), the renderer 23 determines whether diffusely reflected light has been directly computed at one or more surrounding vertices or other positions within a distance that is, for example, one fourth of the predefined constant from the selected vertex (step 730). Like step 718 described above, the renderer 23 extracts the location of the selected vertex from the vertices array 150 and uses it to scan the K-D tree for entries that are within a distance that is one fourth of the predefined constant from the selected vertex. Because no vertices or other positions were located in step 718 or the error value computed in connection with vertices or other positions that were located are not acceptable, the renderer 23 preferably expands the search volume (e.g., expands the volume within which the renderer 23 searches for vertices or other positions). In preferred embodiments of the present invention, vertices or other positions located in step 718 do not count towards the one or more vertices or other positions, if any, located in step 730. In other words, the renderer 23 must identify at least one vertex or other position not located in step 718 to advance to step 734.

If the renderer 23 determines that diffusely reflected light has been directly computed at one or more surrounding vertices or other positions within a distance that is one fourth of the predefined constant from the selected vertex (step 730-Yes), the renderer 23 computes an error value for these vertices or other positions (step 734). Step 734 is essentially identical to step 722, except that the renderer 23 preferably does not re-compute error values for vertices or other positions, if any, located in step 718. Instead, the renderer 23 preferably maintains the error values computed for these vertices or other positions in step 722 for subsequent use in steps 734, 746, and step 758, if need be. The renderer 23 preferably uses the following equation to compute the error value if only one vertex or other position in total is located in step 718 and step 730:

$$\varepsilon_1 = \frac{\|\vec{P} - \vec{P}_1\|}{R_1} + \sqrt{1 - \hat{n} \cdot \hat{n}_1},$$

where $\varepsilon_1$ is the error value corresponding to the diffusely reflected light directly computed at the given vertex or other position, where $\vec{P}$ is a location of the selected vertex, where $\vec{P}_1$ is a location of the given vertex or other position, where $R_1$ is the harmonic mean distance of rays cast from the given vertex or other position, where $\hat{n}$ is the surface normal of the selected vertex, and where $\hat{n}_1$ is the surface normal of the given vertex or other position.

And the renderer 23 preferably uses the following equation to compute the error value if more than one vertex or other position is located in step 718 and/or step 730:

$$\varepsilon = \frac{\sum_{i=1}^{n} \varepsilon_i}{n}$$

where $\varepsilon$ is the error value corresponding to the diffusely reflected light directly computed at each of these vertices or other positions as a group, where n is a count of the one or more vertices or other positions located in step 718 and/or step 730, and where $\varepsilon_i$ is the error value computed for the diffusely reflected light directly computed at the $i^{th}$ vertex or other position in the one or more vertices or other positions located in step 718 and/or step 730.

After computing the error value for the one or more vertices or other positions located in step 718 and/or step 730, the renderer 23 determines whether the error value is acceptable (step 738). The actions of the renderer 23 in step 738 are essentially identical to those of step 726. In preferred embodiments, this determination is again made by reference to the predefined error tolerance included in the object scene data and/or the active object scene data 32. If the error value computed in step 722 is less than this predefined error tolerance, which may be increased by reference to the count of located vertices or other positions, the error value is acceptable.

If the error value computed for the one or more vertices or other positions located in step 718 and/or step 730 is acceptable (step 738-Yes), the renderer 23 computes diffusely reflected light indirectly at the selected vertex (step 770) as described above.

If the error value computed for the one or more vertices or other positions located in step 718 and/or step 730 is unacceptable (step 738-No) or if no vertices or other positions are located in step 718 and step 730 (step 718-No, step 730-No), the renderer 23 determines whether diffusely reflected light has been directly computed at one or more surrounding vertices or other positions within a distance that is, for example, one half of the predefined constant from the selected vertex (step 742). The renderer 23 extracts the location of the selected vertex from the vertices array 150 and uses it to scan the K-D tree for entries that are within a distance that is one half of the predefined constant from the selected vertex. If no vertices or other positions were located in step 718 and step 730 or the error value computed in connection with vertices or other positions that were located is unacceptable, the renderer 23 preferably expands the search volume. In preferred embodiments of the present invention, vertices or other positions located in step 718 and/or step 730 do not count towards the one or more vertices or other positions, if any, located in step 742.

If the renderer 23 determines that diffusely reflected light has been directly computed at one or more surrounding vertices or other positions within a distance that is one half of the predefined constant from the selected vertex (step 742-Yes), the renderer 23 computes an error value for these vertices or other positions (step 746). Step 746 is essentially identical to step 722 and step 734, except that the renderer 23 preferably does not re-compute error values for vertices or other positions, if any, located in step 718 and/or step 730. Instead, the renderer 23 preferably maintains the error values computed for these vertices or other positions in step 722 and/or step 734 for subsequent use in steps 746 and 758, if need be. The renderer 23 preferably uses the following equation to compute the error value if only one vertex or other position in total is located in step 718, step 730, and step 742:

$$\varepsilon_1 = \frac{\|\vec{P} - \vec{P}_1\|}{R_1} + \sqrt{1 - \hat{n} \cdot \hat{n}_1},$$

where $\varepsilon_1$ is the error value corresponding to the diffusely reflected light directly computed at the given vertex or other position, where $\vec{P}$ is a location of the selected vertex, where $\vec{P}_1$ is a location of the given vertex or other position, where $R_1$ is the harmonic mean distance of rays cast from the given vertex or other position, where $\hat{n}$ is the surface normal of the selected vertex, and where $\hat{n}_1$ is the surface normal of the given vertex or other position.

And the renderer 23 preferably uses the following equation to compute the error value if more than one vertex or other position is located in step 718, step 730, and/or step 742:

$$\varepsilon = \frac{\sum_{i=1}^{n} \varepsilon_i}{n}$$

where $\varepsilon$ is the error value corresponding to the diffusely reflected light directly computed at each of these vertices or other positions as a group, where n is a count of the one or more vertices or other positions located in step 718, step 730, and/or step 742, and where $\varepsilon_i$ is the error value computed for the diffusely reflected light directly computed at the $i^{th}$ vertex or other position in the one or more vertices or other positions located in step 718, step 730, and/or step 742.

After computing the error value for the one or more vertices or other positions located in step 718, step 730, and/or step 742, the renderer 23 determines whether the error value is acceptable (step 750). The actions of the renderer 23 in step 750 are essentially identical to those of step 726 and step 738. In preferred embodiments, this determination is again made by reference to the predefined error tolerance included in the object scene data and/or the active object scene data 32. If the error value computed in step 746 is less than this predefined error tolerance, which may be increased by reference to the count of located vertices or other positions, the error value is acceptable.

If the error value computed for the one or more vertices or other positions located in step 718, step 730, and/or step 742 is acceptable (step 750-Yes), the renderer 23 computes diffusely reflected light indirectly at the selected vertex (step 770) as described above.

If the error value computed for the one or more vertices or other positions located in step 718, step 730 and/or step 742 is unacceptable (step 750-No) or if no vertices or other positions are located in step 718, step 730, and step 742 (step 718-No, step 730-No, step 742-No), the renderer 23 determines whether diffusely reflected light has been directly computed at one or more surrounding vertices or other positions within a distance equal to the predefined constant from the selected vertex (step 754). The renderer 23 extracts the location of the selected vertex from the vertices array 150 and uses it to scan the K-D tree for entries that are within a distance that is one half of the predefined constant from the selected vertex. Because no vertices or other positions were located in step 718, step 730, and step 742 or the error value computed in connection with vertices or other positions that were located is unacceptable, the renderer 23 preferably expands the search volume. In preferred embodiments of the present invention, vertices or other positions located in step 718, step 730, and/or step 742 do not count towards the one or more vertices or other positions, if any, located in step 754.

If the renderer 23 determines that diffusely reflected light has been directly computed at one or more surrounding vertices or other positions within a distance that is equal to the predefined constant from the selected vertex (step 754-Yes), the renderer 23 computes an error value for these vertices or other positions (step 758). Step 758 is essentially identical to step 722, step 734, and step 746, except that the renderer 23 preferably does not re-compute error values for vertices or other positions, if any, located in step 718, step 730, and/or step 742. Instead, the renderer 23 preferably maintains the error values computed for these vertices or other positions in step 718, step 730, and/or step 742 for subsequent use in step 758, if need be. The renderer 23 preferably uses the following equation to compute the error value if only one vertex or other position in total is located in step 718, step 730, step 742, and step 754:

$$\varepsilon_1 = \frac{\|\vec{P} - \vec{P}_1\|}{R_1} + \sqrt{1 - \hat{n} \cdot \hat{n}_1},$$

where $\varepsilon_1$ is the error value corresponding to the diffusely reflected light directly computed at the given vertex or other position, where $\vec{P}$ is a location of the selected vertex, where $\vec{P}_1$ is a location of the given vertex or other position, where $R_1$ is the harmonic mean distance of rays cast from the given vertex or other position, where $\hat{n}$ is the surface normal of the selected vertex, and where $\hat{n}_1$ is the surface normal of the given vertex or other position.

And the renderer 23 preferably uses the following equation to compute the error value if more than one vertex or other position is located in step 718, step 730, step 742, and/or step 754:

$$\varepsilon = \frac{\sum_{i=1}^{n} \varepsilon_i}{n}$$

where ϵ is the error value corresponding to the diffusely reflected light directly computed at each of these vertices or other positions as a group, where n is a count of the one or more vertices or other positions located in step 718, step 730, step 742, and/or step 754, and where $\varepsilon_1$ is the error value computed for the diffusely reflected light directly computed at the $i^{th}$ vertex or other position in the one or more vertices or other positions located in step 718, step 730, step 742, and/or step 754.

After computing the error value for the one or more vertices or other positions located in step 718, step 730, step 742, and/or step 754, the renderer 23 determines whether the error value is acceptable (step 762). The actions of the renderer 23 in step 762 are essentially identical to those of step 726, step 738, and step 750. In preferred embodiments, this determination is again made by reference to the predefined error tolerance included in the object scene data and/or the active object scene data 32. If the error value computed in step 758 is less than this predefined error tolerance, which may be increased by reference to the count of located vertices or other positions, the error value is acceptable.

If the error value computed for the one or more vertices or other positions located in step 718, step 730, step 742, and/or step 754 is acceptable (step 762-Yes), the renderer 23 computes diffusely reflected light indirectly at the selected vertex (step 770) as described above.

If the error value computed for the one or more vertices or other positions located in step 718, step 730, step 742, and/or step 754 is unacceptable (step 762-No) or if no vertices or other positions are located in step 718, step 730, step 742, and step 754 (step 718-No, step 730-No, step 742-No, step 754-No), the renderer 23 directly computes diffusely reflected light at the selected vertex directly (step 766).

As noted above, this process includes casting a first set of rays into the object scene from the selected vertex. If it has not already been computed for the same level of recursion, the renderer 23 computes diffusely reflected light at the intersections of these rays and primitives in the object scene. In this example, the recursion level of diffusely reflected light at the intersections of the first set of rays is one.

Again, computing diffusely reflected light at these intersections may include casting a second set of rays from one or more vertices or other positions. In this example, the recursion level of diffusely reflected light at the intersections of the second sets of rays is two. The recursion level increases as additional sets of rays are cast from vertices or other positions. Typically, the object scene data 21 includes an upper recursion level. For example, the object scene data 21 may specify that only the first set of rays and one or more second sets of rays may be cast in order to compute diffusely reflected light at a vertex or other position.

In preferred embodiments of the present invention, the number of rays included in sets of rays cast to compute diffusely reflected light at a vertex or other position decreases as the level of recursion increases. As noted above, the need for accuracy is reduced at each level of recursion because the overall effect of diffusely reflected light at a vertex or other position is reduced at each level of recursion.

Finally, each time a set of rays is cast from an intersection and/or a vertex or other position, certain values, in addition to the diffusely reflected light at the intersection and/or the vertex or other position, are computed and maintained for the intersection and/or the vertex or other position. More specifically, the renderer 23 computes the harmonic mean distance of the rays cast from a given vertex or other position and two gradients for the given vertex or other position by reference to these rays and the contribution of each ray to diffusely reflected light at the given vertex or other position.

The harmonic mean distance is computed as follows:

$$R = \frac{n}{\sum_{i=1}^{n} \frac{1}{a_i}}$$

where R is the harmonic mean distance,
where n is the count of rays, and
where $a_i$ is the length of the $i^{th}$ ray.

Figure 8:
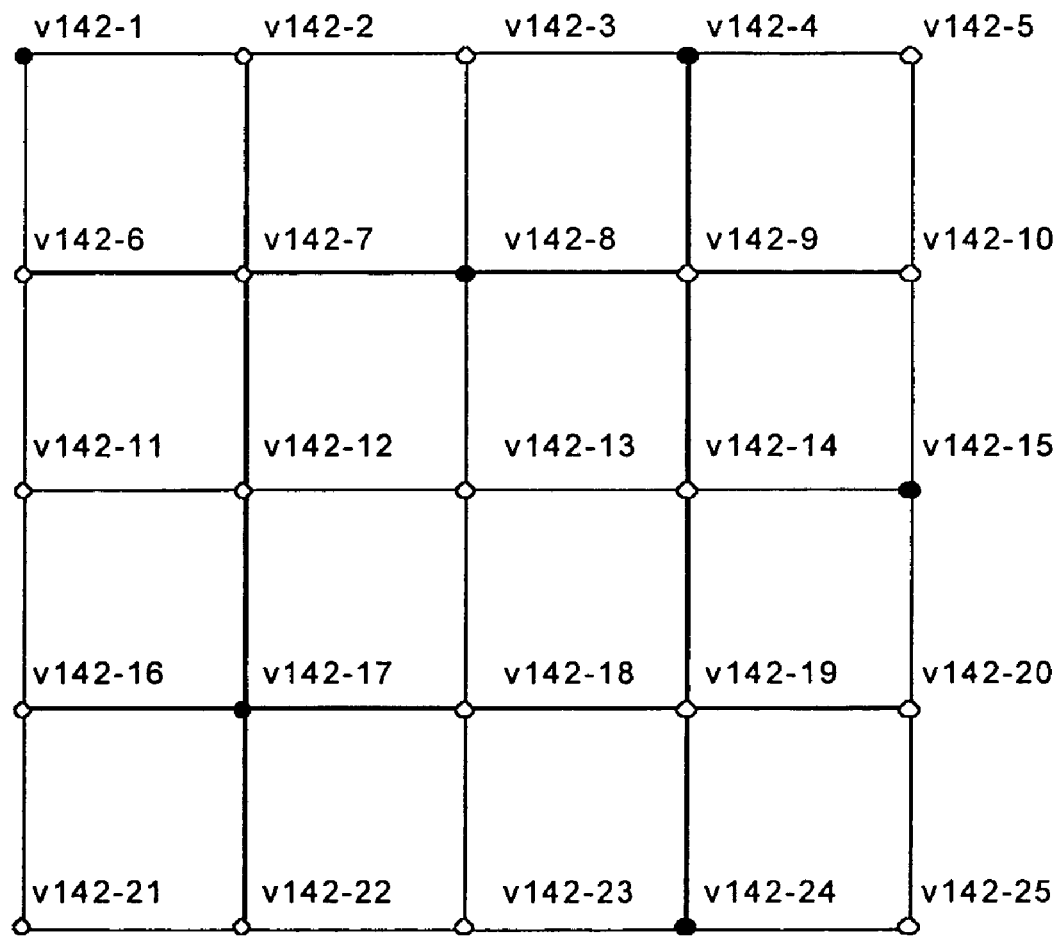
FIG. 8 illustrates a non-regular processing order of the vertices in the grid of polygons illustrated in FIG. 1C.

FIG. 8 illustrates the non-regular processing order described above in connection with FIG. 7. In this illustration, vertices v142-1, v142-24, v142-15, v142-8, v142-4, and v142-17 are the first six vertices selected in step 714 of FIG. 7 (this order is merely for illustration, and not a limitation of the present invention. It is possible that because of the distance between each of these vertices, diffusely reflect light may be directly computed for each of these vertices (in this illustration, it is assumed that it is). Regardless of the processing order of the remaining vertices, diffusely reflected light has been directly computed at neighboring vertices in more than one direction from these vertices (this may be especially true if diffusely reflect light has been directly computed for vertices or other positions not included in the grid illustrated in FIG. 8, but that are within a certain distance of these vertices). As a result, the indirect computation of diffusely reflected light at some or all of these other vertices is more accurate. Further, the variance of indirect light from one vertex to the next, whether computed directly or indirectly, is accurately smoother.

As noted above, the step of shading a visibility grid may include casting rays into the object scene for intersection with shading grids. Determining whether a ray intersects an object may include several steps. If a shading grid has been created for a modeled object in an object scene, the renderer first determines whether the ray intersects a bounding box of the primitive corresponding to the object. If so, the renderer 23 determines whether the ray intersects the bounding box of the shading grid, which typically requires substantially more processing time than determining whether the ray intersects the bounding box of the primitive corresponding to the object. It may be, however, that a shading grid has not yet been created such that determining whether a ray intersects a primitive also includes creating a shading grid so that a bounding box for the shading grid can be computed. For this reason, a shading grid may be created before a visibility grid of a corresponding primitive. In other words, a ray may intersect a primitive before the primitive is hidden in step 258.

After shading the visibility grid corresponding to the selected primitive or portion of a primitive (step 256) or if the visibility grid corresponding to the selected primitive or portion of a primitive is already shaded (step 254-Yes), the renderer hides the visibility grid corresponding to the selected primitive or portion of a primitive (step 258). This step typically includes the renderer 23 projecting the visibility grid onto the image plane and sampling the visibility grid. In other words, the renderer 23 determines elements of the visibility grid that are actually visible or contribute color values to one or more pixels. The renderer 23 may use a number of sampling techniques without departing from the scope of the present invention. For example, the renderer 23 may sample the visibility grid with points, lines, or areas. The renderer 23 may also use area averaging to compute primitive visibility and colors for pixels.

Additionally, the U.S. patent application Ser. No. 10/177,678, filed on Jun. 20, 2002, entitled "SYSTEM AND METHOD OF SIMULATING MOTION BLUR EFFICIENTLY," commonly assigned with the present invention, and incorporated herein by reference, discloses a system and method of simulation motion blur efficiently. Elements of this system and method are used in some embodiments of the present invention during step 258 in particular. The simulation of motion blur, however, is not a limitation of the present invention.

The result of the hiding step is typically a plurality of color, transparency, and depth values maintained by the renderer 23 in the sample buffers 38. The color values preferably incorporate diffusely reflected light directly or indirectly computed. These values may or may not be subsequently overwritten by the renderer 23 following another execution of the hiding step (step 258) in conjunction with other visibility grids. Such visibility grids may actually be closer to the image plane 110 than the (current) visibility grid and, therefore, occlude the (current) visibility grid.

After hiding the visibility grid corresponding to the selected primitive or portion of a primitive, the renderer 23 preferably removes the pointer to the selected primitive or portion of a primitive from its primitive bucket 36 (step 260).

The renderer 23 then determines whether the selected primitive or portion of a primitive is still on-screen (step 262). The step of shading the visibility grid may offset vertices of the visibility grid such that it is no longer in the viewing volume. As a result, step 262 includes bounding the shaded visibility grid corresponding to the selected primitive or portion of a primitive and determining whether the resulting bounding box is on-screen.

Figure 2C:
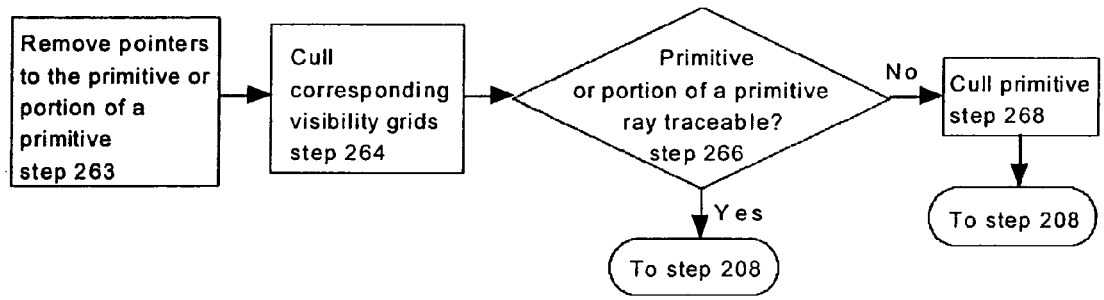

If the renderer 23 determines that the selected primitive or portion of a primitive is not still on-screen (step 262-No), the renderer 23 removes all pointers to the selected primitive or portion of a primitive from remaining primitive buckets 36 (step 263, FIG. 2C). But if the renderer 23, for example, also determines in step 262 that the entire primitive that includes the selected portion is not still on-screen, the renderer 23 may remove all pointers to this primitive from the primitive buckets 36.

The renderer 23 then preferably culls corresponding visibility grids from the active object scene data 32 (step 264). At the very least, a visibility grid created for the selected primitive or the selected portion of a primitive is removed. But if the renderer 23 determines in step 262 that the primitive that includes the selected portion is not still on-screen, the renderer 23 may remove all visibility grids created for this primitive.

The renderer 23 then determines whether the selected primitive or portion of a primitive is ray traceable (step 266).

If the renderer 23 determines that the selected primitive or portion of a primitive is ray traceable (step 226-Yes), the renderer 23 returns to step 208 to select another primitive or portion of a primitive. Since the selected primitive or portion of a primitive may be intersected by a ray while the renderer 23 is shading another primitive, data about the selected primitive or portion of a primitive is preferably maintained.

If the renderer 23 determines that the selected primitive or portion of a primitive is not ray traceable (step 266-No), the renderer 23 culls data related to the selected primitive or the primitive that includes the selected portion from the active object scene data 32 (except, for example, an indication that the selected primitive or the primitive that includes the selected portion has already been processed) (step 268). The renderer 23 then returns to step 208 to select another primitive or portion of a primitive.

Figure 2D:
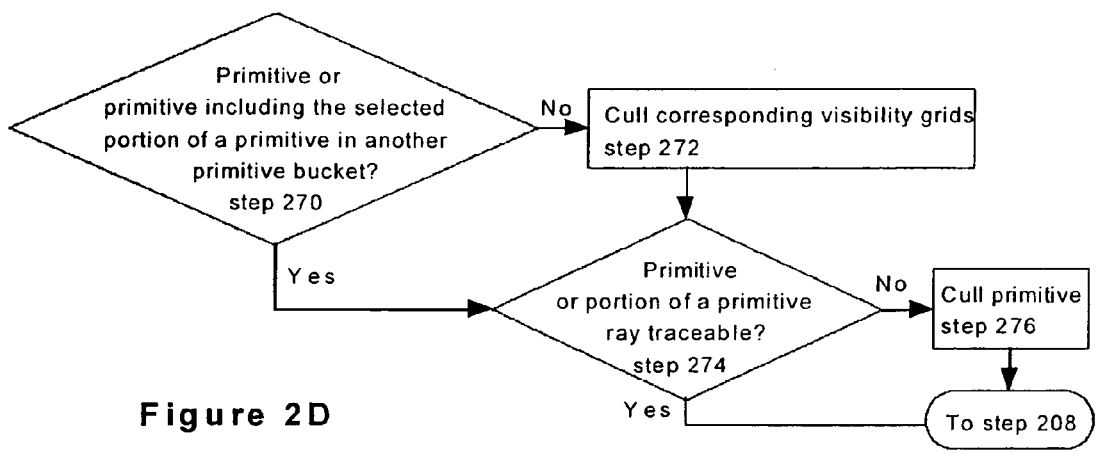

If the renderer 23 determines that the selected primitive or portion of a primitive is still on-screen (step 262-Yes), the renderer 23 determines whether the selected primitive or the primitive that includes the selected portion is referenced in any primitive buckets 36 (step 270, FIG. 2D). If not (step 270-No), the renderer 23 culls the visibility grid created for the selected primitive or the selected portion of a primitive (step 272).

But if the selected primitive or the primitive that includes the selected portion is referenced in any primitive buckets 36 (step 270-Yes) or after executing step 272, the renderer 23 determines whether the selected primitive or portion of a primitive is ray traceable (step 274). If the renderer 23 determines that the selected primitive or portion of a primitive is ray traceable (step 274-Yes), the renderer 23 returns to step 208 to select another primitive or portion of a primitive. Since the selected primitive or portion of a primitive may be intersected by a ray while the renderer 23 is shading another primitive, data about the selected primitive or portion of a primitive is preferably maintained.

If the renderer 23 determines that the selected primitive or portion of a primitive is not ray traceable (step 274-No), the renderer 23 culls data related to the selected primitive or the primitive that includes the selected portion from the active object scene data 32 (except, for example, an indication that the selected primitive or the primitive that includes the selected portion has already been processed) (step 276). The renderer 23 then returns to step 208 to select another primitive or portion of a primitive.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

The present invention can be implemented as a computer program product that includes a computer program mechanism embedded in a computer readable storage medium. For instance, the computer program product could contain the program modules shown in FIG. 1A. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

What is claimed is:

1. A method for computing reflected light in an object scene comprising:

generating a higher-resolution grid of polygons for approximating an object in the object scene;
generating a lower-resolution grid of polygons for approximating the object in the object scene;
selecting a first position on the higher-resolution grid at which reflected light is to be calculated;
determining a second position on the lower-resolution grid corresponding to the first position on the higher-resolution grid;
tracing a ray originating from the second position toward an intersection with a third position in the object scene; and
calculating reflected light at the first position on the higher-resolution grid by taking into account light from the third position.

2. The method of claim 1 wherein the third position represents a light source in the object scene.

3. The method of claim 1 wherein the third position represents another position on the lower-resolution grid of polygons for approximating the object in the object scene.

4. The method of claim 1 wherein the third position represents a position on a lower-resolution grid of polygons for approximating another object in the object scene.

5. The method of claim 1 wherein the second position on the lower-resolution grid is determined as a point on the lower-resolution grid that represents an intersection of the lower-resolution grid and a ray originating from the first position toward the third position.

6. The method of claim 1 wherein the second position on the lower-resolution grid is determined as a point on the lower-resolution grid that is closest to the third position.

7. The method of claim 1 wherein the second position on the lower-resolution grid is determined as a vertex on the lower-resolution grid that is closest to an intersection of the lower-resolution grid and a ray originating from the first position toward the third position.

8. The method of claim 1 wherein the second position on the lower-resolution grid is determined as a vertex on the lower-resolution grid that is closest to a point on the lower-resolution grid that is closest to the third position.

9. The method of claim 1 further comprising steps of tracing additional rays originating from the second position toward intersections with other positions in the object scene and calculating reflected light at the first position on the higher-resolution grid by taking into account light from the other positions.

10. The method of claim 1 wherein the higher-resolution grid and lower-resolution grid each approximates the object by approximating a portion of the object.

11. The method of claim 1,
wherein the higher-resolution grid comprises a plurality of first vertices, each first vertex associated with at least one parametric value;
wherein the lower-resolution grid comprises a plurality of second vertices, each second vertex associated with at least one parametric value;
wherein the second position on the lower-resolution grid is determined from a selected vertex on the higher-resolution grid, by taking into account the at least one parametric value associated the selected vertex on the higher-resolution grid and the at least one parametric value associated with each of a plurality of vertices on the lower-resolution grid surrounding the second position on the lower-resolution grid.

12. The method of claim 11 wherein the at least one parametric value associated with each vertex comprises a single scalar value.

13. The method of claim 11 wherein the plurality of vertices on the lower-resolution grid surrounding the second position on the lower-resolution grid comprises two vertices.

14. The method of claim 11 wherein the at least one parametric value associated with each vertex comprises a pair of scalar values.

15. The method of claim 11 wherein the plurality of vertices on the lower-resolution grid surrounding the second position on the lower-resolution grid comprises four vertices.

16. The method of claim 11 wherein the second position on the lower-resolution grid is determined by applying bilinear interpolation that utilizing the at least one parametric value associated the selected vertex on the higher-resolution grid and the at least one parametric value associated with each of the plurality of vertices on the lower-resolution grid surrounding the second position on the lower-resolution grid.

17. A computer program product comprising:
a computer usable medium having computer readable program code means embodied therein for causing reflected light to be computed for an object scene, the computer readable program code means in said computer program product comprising:
computer readable program code means for causing a computer to generate a higher-resolution grid of polygons for approximating an object in the object scene;
computer readable program code means for causing a computer to generate a lower-resolution grid of polygons for approximating the object in the object scene;
computer readable program code means for causing a computer to select a first position on the higher-resolution grid at which reflected light is to be calculated;
computer readable program code means for causing a computer to determine a second position on the lower-resolution grid corresponding to the first position on the higher-resolution grid;
computer readable program code means for causing a computer to trace a ray originating from the second position toward an intersection with a third position in the object scene; and
computer readable program code means for causing a computer to calculate reflected light at the first position on the higher-resolution grid by taking into account light from the third position.

18. The computer program product of claim 17 wherein the third position represents a light source in the object scene.

19. The computer program product of claim 17 wherein the third position represents another position on the lower-resolution grid of polygons for approximating the object in the object scene.

20. The computer program product of claim 17 wherein the third position represents a position on a lower-resolution grid of polygons for approximating another object in the object scene.

21. The computer program product of claim 17,
wherein the higher-resolution grid comprises a plurality of first vertices, each first vertex associated with at least one parametric value;
wherein the lower-resolution grid comprises a plurality of second vertices, each second vertex associated with at least one parametric value;
wherein the second position on the lower-resolution grid is determined from a selected vertex on the higher-resolution grid, by taking into account the at least one parametric value associated the selected vertex on the higher-resolution grid and the at least one parametric value associated with each of a plurality of vertices on the lower-resolution grid surrounding the second position on the lower-resolution grid.

22. A system for computing reflected light in an object scene comprising:

means for generating a higher-resolution grid of polygons for approximating an object in the object scene;

means for generating a lower-resolution grid of polygons for approximating the object in the object scene;

means for selecting a first position on the higher-resolution grid at which reflected light is to be calculated;

means for determining a second position on the lower-resolution grid corresponding to the first position on the higher-resolution grid;

means for tracing a ray originating from the second position toward an intersection with a third position in the object scene; and means for calculating reflected light at the first position on the higher-resolution grid by taking into account light from the third position.

* * * * *